United States Patent
Terashima et al.

(10) Patent No.: US 9,602,791 B2
(45) Date of Patent: Mar. 21, 2017

(54) DISCHARGE LAMP DRIVING DEVICE, PROJECTOR, AND DISCHARGE LAMP DRIVING METHOD

(71) Applicant: SEIKO EPSON CORPORATION, Tokyo (JP)

(72) Inventors: Tetsuo Terashima, Azumino (JP); Yoichi Nakagomi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/045,739

(22) Filed: Feb. 17, 2016

(65) Prior Publication Data
US 2016/0249440 A1   Aug. 25, 2016

(30) Foreign Application Priority Data

Feb. 24, 2015 (JP) .................................. 2015-033850
Feb. 26, 2015 (JP) .................................. 2015-036609

(51) Int. Cl.
*H04N 9/31* (2006.01)
*G03B 21/20* (2006.01)
(Continued)

(52) U.S. Cl.
CPC ......... *H04N 9/3197* (2013.01); *G03B 21/006* (2013.01); *G03B 21/2053* (2013.01);
(Continued)

(58) Field of Classification Search
None
See application file for complete search history.

(56) References Cited

U.S. PATENT DOCUMENTS 7,956,315 B2 * 6/2011 Yamauchi .......... H05B 41/2885
                                                     250/205
8,008,869 B2 * 8/2011 Soma ................. H05B 41/2928
                                                     315/209 R
(Continued)

FOREIGN PATENT DOCUMENTS

EP          2 180 767 A2     4/2010
EP          2 197 250 A1     6/2010
(Continued)

OTHER PUBLICATIONS

Jul. 12, 2016 Extended Search Report issued in European Patent Application No. 16156908.2.

*Primary Examiner* — Vibol Tan
(74) *Attorney, Agent, or Firm* — Oliff PLC

(57) ABSTRACT

A discharge lamp driving device includes a discharge lamp driving unit configured to supply driving current to a discharge lamp provided with a first electrode and a second electrode, and a controller configured to control the discharge lamp driving unit. The driving current includes a first AC period and a second AC period in which an AC current is supplied. The first AC period includes a plurality of consecutive first unit driving periods each of which is formed of a first polarity period and a second polarity period, a length of the first polarity period being larger than a length of the second polarity period. The second AC period includes a plurality of consecutive second unit driving periods each of which is formed of the first polarity period and the second polarity period, the length of the second polarity period being larger than the length of the first polarity period.

27 Claims, 12 Drawing Sheets

(51) Int. Cl.
*G03B 21/00* (2006.01)
*H05B 41/292* (2006.01)
*H05B 41/288* (2006.01)

(52) U.S. Cl.
CPC ......... *H04N 9/3123* (2013.01); *H04N 9/3141* (2013.01); *H04N 9/3179* (2013.01); *H05B 41/2887* (2013.01); *H05B 41/2928* (2013.01); *Y02B 20/202* (2013.01)

(56) References Cited

U.S. PATENT DOCUMENTS

| | | | | |
|---|---|---|---|---|
| 8,120,282 B2* | 2/2012 | Yamauchi | .......... | H05B 41/2928 315/247 |
| 8,174,199 B2* | 5/2012 | Soma | .......... | H05B 41/2886 315/209 R |
| 8,269,424 B2* | 9/2012 | Terashima | .......... | H05B 41/2883 315/246 |
| 8,378,581 B2* | 2/2013 | Terashima | .......... | H05B 41/2928 315/246 |
| 8,400,068 B2* | 3/2013 | Terashima | .......... | H05B 41/2883 315/246 |
| 8,773,036 B2* | 7/2014 | Terashima | .......... | G03B 21/2026 315/287 |
| 8,853,961 B2* | 10/2014 | Terashima | .......... | H05B 41/2928 315/246 |
| 8,988,006 B2* | 3/2015 | Terashima | .......... | G03B 21/2026 315/246 |
| 9,338,416 B2* | 5/2016 | Suzuki | ............ | G03B 21/005 |
| 9,398,275 B2* | 7/2016 | Suzuki | ............ | G03B 21/005 |
| 9,439,274 B2* | 9/2016 | Nakagomi | .......... | H05B 41/3927 |
| 2003/0001518 A1 | 1/2003 | Riederer | | |
| 2009/0153073 A1 | 6/2009 | Yamauchi et al. | | |
| 2009/0212711 A1 | 8/2009 | Terashima et al. | | |
| 2009/0212714 A1 | 8/2009 | Terashima et al. | | |
| 2010/0103388 A1 | 4/2010 | Yamauchi et al. | | |
| 2010/0157257 A1 | 6/2010 | Nishizawa et al. | | |
| 2011/0012525 A1 | 1/2011 | Terashima | | |
| 2011/0018456 A1 | 1/2011 | Terashima | | |
| 2011/0121746 A1 | 5/2011 | Yamamoto et al. | | |
| 2012/0043904 A1* | 2/2012 | Terashima | .......... | H05B 41/2928 315/224 |

FOREIGN PATENT DOCUMENTS

| | | |
|---|---|---|
| JP | 2008-123910 A | 5/2008 |
| JP | 2009-199865 A | 9/2009 |
| JP | 2009-205840 A | 9/2009 |
| JP | 4436605 B2 | 3/2010 |
| JP | 2010-102930 A | 5/2010 |
| JP | 2010-108694 A | 5/2010 |
| JP | 2010-135343 A | 6/2010 |
| JP | 2011-003556 A | 1/2011 |
| JP | 2011-003557 A | 1/2011 |
| JP | 2011-023288 A | 2/2011 |
| JP | 2011-028943 A | 2/2011 |
| JP | 2012-059718 A | 3/2012 |
| JP | 5333764 B2 | 11/2013 |
| WO | 02/091806 A1 | 11/2002 |
| WO | 2008/053428 A1 | 5/2008 |
| WO | 2009/041367 A1 | 4/2009 |

\* cited by examiner

DISCHARGE LAMP DRIVING DEVICE, PROJECTOR, AND DISCHARGE LAMP DRIVING METHOD

CROSS-REFERENCE

This application is based upon and claims the benefit of priority from Japanese Patent Application No. 2015-033850, filed Feb. 24, 2015, and Japanese Patent Application No. 2015-036609, filed Feb. 26, 2015; the entire contents of which are incorporated herein by reference.

BACKGROUND

1. Technical Field

The present invention relates to a discharge lamp driving device, a light source apparatus, a projector, and a discharge lamp driving method.

2. Related Art

A problem is known in which, if a lamp voltage is reduced due to deterioration in a discharge lamp, an electrode is unlikely to be melted, and thus a protrusion of an electrode tip is thinned so that deterioration in the discharge lamp is accelerated.

In relation to this problem, for example, as disclosed in JP-A-2011-23288, a method has been proposed in which a DC current is inserted into an AC current supplied to a discharge lamp, and a DC current component is increased according to the progress of a deterioration state of the discharge lamp.

However, in the above-described method, since a melting amount of a protrusion of an electrode tip serving as an anode is improved due to the DC current but the temperature of an electrode serving as a cathode is reduced, there is a problem in that a shape of an electrode tip serving as the cathode is deformed, and thus flickering occurs. Therefore, there is a case where the lifespan of the discharge lamp may not be sufficiently lengthened.

SUMMARY

An advantage of some aspects of the invention is to provide a discharge lamp driving device which can improve the lifespan of a discharge lamp, a light source apparatus including the discharge lamp driving device, and a projector including the light source apparatus. Another advantage of some aspects of the invention is to provide a discharge lamp driving method capable of improving the lifespan of a discharge lamp.

A discharge lamp driving device according to one aspect of the invention includes a discharge lamp driving unit configured to supple a driving current to a discharge lamp provided with a first electrode and a second electrode; and a controller configured to control the discharge lamp driving unit, in which the driving current includes a first AC period and a second AC period in which an AC current is supplied to the discharge lamp. The first AC period includes a plurality of consecutive first unit driving periods each of which is formed of a first polarity period in which the first electrode serves as an anode and a second polarity period in which the second electrode serves as an anode, a length of the first polarity period being larger than a length of the second polarity period. The second AC period includes a plurality of consecutive second unit driving periods each of which is formed of the first polarity period and the second polarity period, the length of the second polarity period being larger than the length of the first polarity period.

According to the discharge lamp driving device according to the aspect of the invention, a ratio of the length of the first polarity period to the length of the second polarity period in the first unit driving period forming the first AC period is more than 1. Therefore, in the first AC period, a sum of the lengths of the first polarity periods is larger than a sum of the lengths of the second polarity periods, and thus it is possible to improve a melting amount of a protrusion at a tip of the first electrode serving as an anode in the first polarity period. On the other hand, the second polarity period which is shorter than the first polarity period and in which an opposite polarity occurs is provided in each of the plurality of first unit driving periods included in the first AC period, and thus it is possible to minimize a decrease in the temperature of the second electrode serving as an anode in the second polarity period. Consequently, it is possible to prevent a protrusion at a tip of the second electrode from being deformed and thus to minimize the occurrence of flickering. This is also the same for the second AC period except that the first electrode and the second electrode are reverse to each other.

According to the discharge lamp driving device according to the aspect of the invention, since a melting amount of the protrusion at the tip of the electrode on the heated side can be improved, and the protrusion at the tip of the electrode on the opposite side to the heated side can be prevented from being deformed so that the occurrence of flickering is minimized, it is possible to provide the discharge lamp driving device capable of improving the lifespan of the discharge lamp.

The electrode on the heated side is the first electrode in the first AC period, and is the second electrode in the second AC period.

The aspect of the invention may be configured such that a ratio of the length of the first polarity period to the length of the second polarity period in each of the first unit driving periods is equal to or more than 3.0, and a ratio of the length of the second polarity period to the length of the first polarity period in each of the second unit driving periods is equal to or more than 3.0.

According to the configuration, it is possible to minimize a decrease in the temperature of the electrode on the opposite side to the heated side and also to further improve a melting amount of the protrusion at the tip of the electrode on the heated side.

The aspect of the invention may be configured such that each of the length of the second polarity period in the first unit driving period and the length of the first polarity period in the second unit driving period is less than 1.0 ms.

According to the configuration, since a time period in which the electrode on the heated side serves as an anode can be relatively increased, it is possible to further improve a melting amount of the protrusion at the tip of the electrode on the heated side.

The aspect of the invention may be configured such that each of the length of the second polarity period in the first unit driving period and the length of the first polarity period in the second unit driving period is equal to or more than 0.16 ms.

According to the configuration, it is possible to minimize a decrease in the temperature of the electrode on the opposite side to the heated side.

The aspect of the invention may be configured such that each of the length of the first polarity period in the first unit driving period and the length of the second polarity period in the second unit driving period is equal to or more than 1.0 ms.

According to the configuration, it is possible to further improve a melting amount of the protrusion at the tip of the electrode on the heated side.

The aspect of the invention may be configured such that each of a length of the first AC period and a length of the second AC period is equal to or more than 5.0 ms.

According to the configuration, it is possible to further improve a melting amount of the protrusion at the tip of the electrode on the heated side.

The aspect of the invention may be configured such that a length of the first AC period and a length of the second AC period are the same as each other.

According to the configuration, it is possible to heat and melt the first electrode and the second electrode with good balance.

The aspect of the invention may be configured such that a length of the first AC period and a length of the second AC period are different from each other.

According to the configuration, since the temperature of the electrode on the heated side can be made higher in a longer period of the first AC period and the second AC period, it is possible to further improve a melting amount of the protrusion.

The aspect of the invention may be configured such that the driving current further includes a third AC period in which an AC current is supplied to the discharge lamp, and the third AC period includes a plurality of consecutive third unit driving periods in which the length of the first polarity period and the length of the second polarity period are the same as each other, and is provided immediately after at least one of the first AC period and the second AC period.

According to the configuration, it is possible to control a shape or the extent of growth of the protrusion.

The aspect of the invention may be configured such that each of the length of the first AC period and the length of the second AC period is set to become larger as driving power supplied to the discharge lamp is decreased.

According to the configuration, in a case where driving power is low, it is possible to improve a melting amount of the protrusions of the first electrode and the second electrode.

The aspect of the invention may be configured such that each of an average length of the first polarity periods in the first AC period and an average length of the second polarity periods in the second AC period is set to become smaller as driving power supplied to the discharge lamp is decreased.

According to the configuration, in a case where driving power is low, it is possible to minimize a decrease in the temperature of the second electrode on the opposite side to the heated side when the length of the first AC period is increased. It is possible to minimize a decrease in the temperature of the first electrode on the opposite side to the heated side when the length of the second AC period is increased.

The aspect of the invention may be configured such that the discharge lamp driving device further includes a voltage detection unit configured to detect an inter-electrode voltage between the first electrode and the second electrode, and each of a length of the first AC period and a length of the second AC period is set to become larger as the inter-electrode voltage becomes higher.

According to the configuration, in a case where an inter-electrode voltage is high, it is possible to improve a melting amount of the protrusions of the first electrode and the second electrode.

The aspect of the invention may be configured such that the discharge lamp driving device further includes a voltage detection unit configured to detect an inter-electrode voltage between the first electrode and the second electrode, and each of an average length of the first polarity periods in the first AC period and an average length of the second polarity periods in the second AC period is set to become smaller as the inter-electrode voltage becomes higher.

According to the configuration, in a case where an inter-electrode voltage is high, it is possible to minimize a decrease in the temperature of the second electrode on the opposite side to the heated side when the length of the first AC period is increased. It is possible to minimize a decrease in the temperature of the first electrode on the opposite side to the heated side when the length of the second AC period is increased.

The aspect of the invention may be configured such that lengths of the first unit driving periods which are temporally adjacent to each other are different from each other, and lengths of the second unit driving periods which are temporally adjacent to each other are different from each other.

According to the configuration, for example, when the discharge lamp driving device is mounted in a projector, it is possible to minimize the occurrence of noise due to interference between overshoot of the driving current caused by polarity switching in the electrode and liquid crystal panels of the projector.

The aspect of the invention may be configured such that lengths of the first polarity periods which are temporally adjacent to each other with the second polarity period interposed therebetween are different from each other in the first AC period, and lengths of the second polarity periods which are temporally adjacent to each other with the first polarity period interposed therebetween are different from each other in the second AC period.

According to the configuration, since a heat load applied to the first electrode varies for each first polarity period in the first AC period, growth of the protrusion is stabilized. Since a heat load applied to the second electrode varies for each second polarity period in the second AC period, growth of the protrusion is stabilized.

The aspect of the invention may be configured such that lengths of the plurality of first polarity periods are set to decrease as the first polarity period is provided temporally later in the first AC period, and lengths of the plurality of second polarity periods decrease as the second polarity period is provided temporally later in the second AC period.

According to the configuration, it is possible to minimize a decrease in the temperature of the electrode on the opposite side to the heated side.

The aspect of the invention may be configured such that the driving current further includes a first waveform period and a second waveform period each of which is formed of the first AC period and the second AC period; a sum of lengths of the first polarity periods in the first AC period of the second waveform period is larger than a sum of lengths of the first polarity periods in the first AC period of the first waveform period; and a sum of lengths of the second polarity periods in the second AC period of the second waveform period is larger than a sum of lengths of the second polarity periods in the second AC period of the first waveform period.

According to the configuration, the length of the first polarity period and the length of the second polarity period are different from each other in the unit driving period forming each AC period. For this reason, in each AC period, an electrode serving as an anode is heated in a longer period of the first polarity period and the second polarity period. Consequently, it is possible to improve a melting amount of the protrusion of the electrode on the heated side in the AC period. On the other hand, a period in which the electrode on the opposite side to the heated side is heated is provided so as to be shorter than the period in which the electrode on the heated side is heated for each of the plurality of unit driving periods forming the AC period. Therefore, it is possible to minimize a decrease in the temperature of the electrode on the opposite side to the heated side in the AC period. Consequently, the protrusion at the tip of the electrode can be prevented from being deformed so that the occurrence of flickering is minimized.

Therefore, according to the configuration, since a melting amount of the protrusion at the tip of the electrode on the heated side can be improved, and the protrusion at the tip of the electrode on the opposite side to the heated side can be prevented from being deformed so that the occurrence of flickering is minimized, it is possible to provide the discharge lamp driving device capable of improving the lifespan of the discharge lamp.

According to the configuration, the second waveform period is provided in which a larger sum of lengths among a sum of lengths of the first polarity periods and a sum of lengths of the second polarity periods in the AC period is larger than in the first waveform period. For this reason, a heat load applied to the first electrode and the second electrode can be changed in the first waveform period and the second waveform period, and thus it is possible to cause protrusions of the first electrode and the second electrode to stably grow.

The aspect of the invention may be configured such that the second waveform period includes a first AC waveform period formed of only the first AC period, and a second AC waveform period formed of only the second AC period, and the first waveform period is provided between the first AC waveform period and the second AC waveform period.

According to the configuration, it is possible to easily adjust growth of the protrusions of the first electrode and the second electrode in accordance with characteristics of the electrodes.

The aspect of the invention may be configured such that, in the second waveform period, a ratio of the length of the first polarity period to the length of the second polarity period in each of the first unit driving periods of the first AC period is equal to or more than 6.0, and a ratio of the length of the second polarity period to the length of the first polarity period in each of the second unit driving periods of the second AC period is equal to or more than 6.0.

According to the configuration, it is possible to increase a variation width of a heat load applied to the electrode, and thus to further stabilize growth of the protrusion of the electrode.

The aspect of the invention may be configured such that each of a length of the first AC period and a length of the second AC period in the second waveform period is equal to or more than 20 ms.

According to the configuration, it is possible to increase a variation width of a heat load applied to the electrode, and thus to further stabilize growth of the protrusion of the electrode.

The aspect of the invention may be configured such that each of a length of the first AC period and a length of the second AC period in the second waveform period is equal to or more than 200 ms.

According to the configuration, it is possible to increase a variation width of a heat load applied to the electrode, and thus to further stabilize growth of the protrusion of the electrode.

The aspect of the invention may be configured such that, in the second waveform period, the maximum value of a ratio of the length of the first polarity period to the length of the second polarity period in each of the first unit driving periods of the first AC period and the maximum value of a ratio of the length of the second polarity period to the length of the first polarity period in each of the second unit driving periods of the second AC period are greater than in the first waveform period.

According to the configuration, it is possible to increase a heat load applied to the electrode in the second waveform period, and thus to increase a variation width of the heat load applied to the electrode in the first waveform period and the second waveform period. Consequently, it is possible to further stabilize growth of the protrusion of the electrode.

The aspect of the invention may be configured such that, in the second waveform period, the minimum value of a ratio of the length of the first polarity period to the length of the second polarity period in each of the first unit driving periods of the first AC period and the minimum value of a ratio of the length of the second polarity period to the length of the first polarity period in each of the second unit driving periods of the second AC period are greater than in the first waveform period.

According to the configuration, it is possible to increase a heat load applied to the electrode in the second waveform period, and thus to increase a variation width of the heat load applied to the electrode in the first waveform period and the second waveform period. Consequently, it is possible to further stabilize growth of the protrusion of the electrode.

The aspect of the invention may be configured such that each of the length of the first AC period of the second waveform period and the length of the second AC period of the second waveform period is larger than the lengths of the first AC period and the second AC period of the first waveform period.

According to the configuration, it is possible to increase a heat load applied to the electrode in the second waveform period, and thus to increase a variation width of the heat load applied to the electrode in the first waveform period and the second waveform period. Consequently, it is possible to further stabilize growth of the protrusion of the electrode.

The aspect of the invention may be configured such that, in the second waveform period, each of the length of the first polarity period in the first unit driving period and the length of the second polarity period in the second unit driving period is equal to or more than 2.5 ms.

According to the configuration, it is possible to increase a heat load applied to the electrode in the second waveform period, and thus to increase a variation width of the heat load applied to the electrode in the first waveform period and the second waveform period. Consequently, it is possible to further stabilize growth of the protrusion of the electrode.

The aspect of the invention may be configured such that the discharge lamp driving device further includes a voltage detection unit configured to detect an inter-electrode voltage between the first electrode and the second electrode, and a sum of the first polarity periods of the first unit driving periods in the first AC period and a sum of the second polarity periods of the second unit driving periods in the second AC period are set to become larger as the inter-electrode voltage becomes higher.

According to the configuration, in a case where the inter-electrode voltage is high, it is possible to improve a melting amount of the protrusion of the electrode.

The aspect of the invention may be configured such that each of the length of the first AC period and the length of the second AC period is set to become larger as the inter-electrode voltage becomes higher.

According to the configuration, in a case where the inter-electrode voltage is high, it is possible to improve a melting amount of the protrusion of the electrode.

The aspect of the invention may be configured such that a ratio of the length of the first polarity period to the length of the second polarity period of the first unit driving period and a ratio of the length of the second polarity period to the length of the first polarity period of the second unit driving period are set to become higher as the inter-electrode voltage becomes higher.

According to the configuration, in a case where the inter-electrode voltage is high, it is possible to improve a melting amount of the protrusion of the electrode.

The aspect of the invention may be configured such that the discharge lamp driving device further includes a voltage detection unit configured to detect an inter-electrode voltage between the first electrode and the second electrode, and a ratio of the entire length of the second waveform period to the entire length of the first waveform period is set to become higher in the driving current as the inter-electrode voltage becomes higher.

According to the configuration, in a case where the inter-electrode voltage is high, it is possible to improve a melting amount of the protrusion of the electrode.

The aspect of the invention may be configured such that a sum of the first polarity periods of the first unit driving periods in the first AC period and a sum of the second polarity periods of the second unit driving periods in the second AC period are set to become larger as driving power supplied to the discharge lamp becomes lower.

According to the configuration, in a case where the driving power is low, it is possible to improve a melting amount of the protrusion of the electrode.

The aspect of the invention may be configured such that each of the length of the first AC period and the length of the second AC period is set to become larger as the driving power becomes lower.

According to the configuration, in a case where the driving power is low, it is possible to improve a melting amount of the protrusion of the electrode.

The aspect of the invention may be configured such that a ratio of the length of the first polarity period to the length of the second polarity period of the first unit driving period and a ratio of the length of the second polarity period to the length of the first polarity period of the second unit driving period are set to become higher as the driving power becomes lower.

According to the configuration, in a case where the driving power is low, it is possible to improve a melting amount of the protrusion of the electrode.

The aspect of the invention may be configured such that a ratio of the entire length of the second waveform period to the entire length of the first waveform period is set to become higher in the driving current as the driving power supplied to the discharge lamp becomes lower.

According to the configuration, in a case where the driving power is low, it is possible to improve a melting amount of the protrusion of the electrode.

A light source apparatus according to one aspect of the invention includes the discharge lamp configured to emit light; and the discharge lamp driving device.

According to the light source apparatus according to the aspect of the invention, the discharge lamp driving device is provided therein, and thus it is possible to provide the light source apparatus capable of improving the lifespan of the discharge lamp.

A projector according to one aspect of the invention includes the light source apparatus; a light modulation element configured to modulate light emitted from the light source apparatus according to a video signal; and a projection optical system configured to project light modulated by the light modulation element.

According to the aspect of the invention relating to the projector, the light source apparatus is provided therein, and thus it is possible to provide the projector capable of improving the lifespan of the discharge lamp.

A discharge lamp driving method according to one aspect of the invention, the method for driving a discharge lamp to supply a driving current to the discharge lamp provided with a first electrode and a second electrode includes supplying the driving current including a first AC period and a second AC period in which an AC current is supplied to the discharge lamp. The first AC period includes a plurality of consecutive first unit driving periods each of which is formed of a first polarity period in which the first electrode serves as an anode and a second polarity period in which the second electrode serves as an anode, a length of the first polarity period being larger than a length of the second polarity period. The second AC period includes a plurality of consecutive second unit driving periods each of which is formed of the first polarity period and the second polarity period, the length of the second polarity period being larger than the length of the first polarity period.

According to the aspect of the invention relating to the discharge lamp driving method, it is possible to improve the lifespan of the discharge lamp as described above.

The aspect of the invention may be configured such that the driving current further includes a first waveform period and a second waveform period each of which is formed of the first AC period and the second AC period; a sum of lengths of the first polarity periods in the first AC period of the second waveform period is larger than a sum of lengths of the first polarity periods in the first AC period of the first waveform period; and a sum of lengths of the second polarity periods in the second AC period of the second waveform period is larger than a sum of lengths of the second polarity periods in the second AC period of the first waveform period.

According to the configuration, it is possible to improve the lifespan of the discharge lamp as described above.

BRIEF DESCRIPTION OF THE DRAWINGS

The invention will be described with reference to the accompanying drawings, wherein like numbers reference like elements.

FIG. 63 is a diagram illustrating states of protrusions of electrode tips of the discharge lamp.

DESCRIPTION OF EXEMPLARY EMBODIMENTS

Hereinafter, with reference to the drawings, a projector according to embodiments of the invention will be described.

The scope of the invention is not limited to the following embodiments, and can be arbitrarily changed within the scope of the technical spirit of the invention. In the following drawings, for better understanding of each constituent element, a scale, the number, and the like thereof in each structure may be different from a scale, the number, and the like thereof in an actual structure.

First Embodiment

Figure 1:
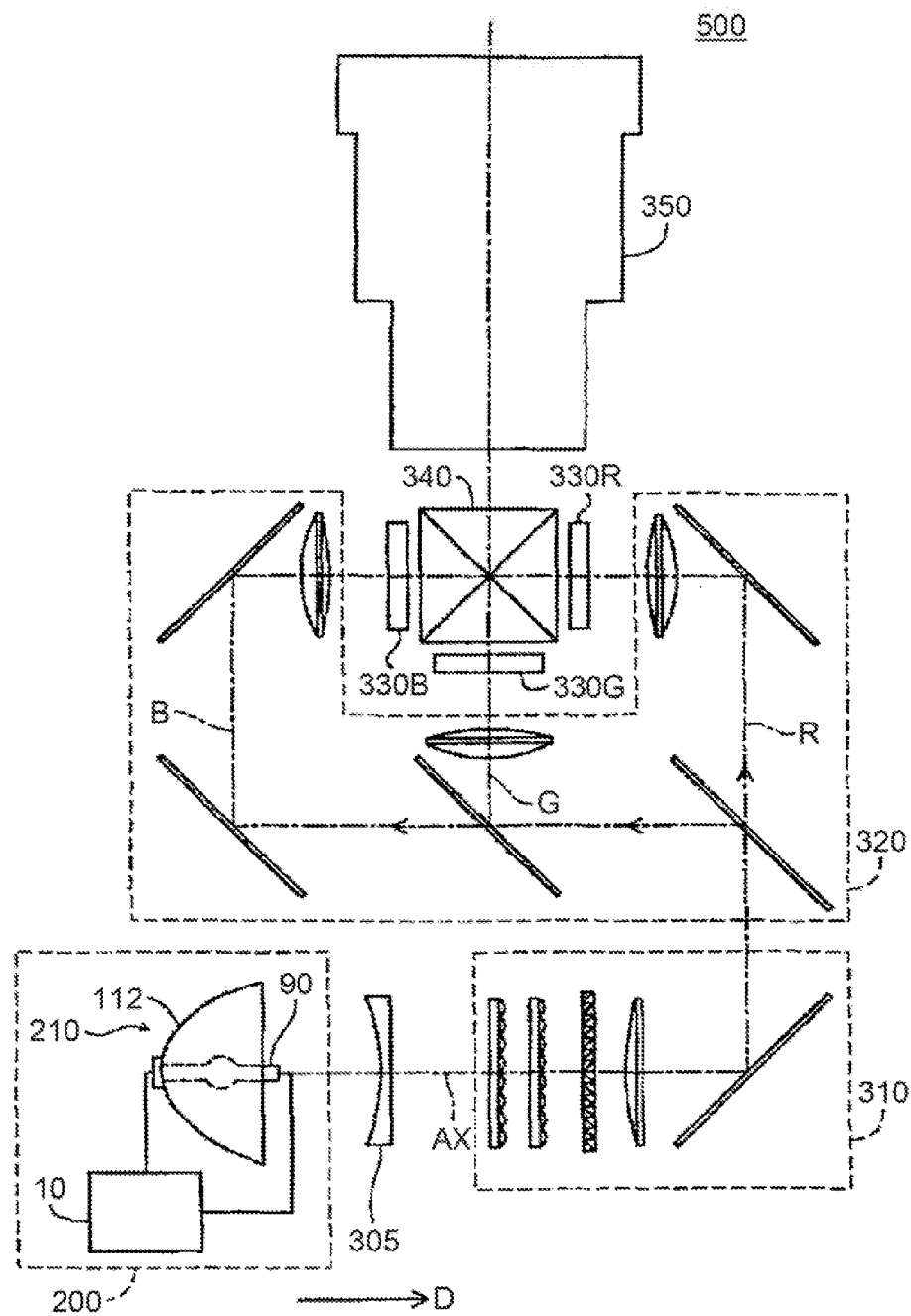
FIG. 1 is a schematic configuration diagram illustrating a projector according to a first embodiment.

As illustrated in FIG. 1, a projector 500 of the present embodiment includes a light source apparatus 200, a collimating lens 305, an illumination optical system 310, a color separation optical system 320, three liquid crystal light valves 330R, 330G and 330B (light modulation elements), across dichroic prism 340, and a projection optical system 350.

Light emitted from the light source apparatus 200 passes through the collimating lens 305 and is incident to the illumination optical system 310. The collimating lens 305 collimates the light from the light source apparatus 200.

The illumination optical system 310 adjusts the illuminance of the light emitted from the light source apparatus 200 so that the illuminance is uniformized on the liquid crystal light valves 330R, 330G and 330B. The illumination optical system 310 aligns polarization directions of the light emitted from the light source apparatus 200 in one direction. This is aimed at effectively using the light emitted from the light source apparatus 200 in the liquid crystal light valves 330R, 330G and 330B.

The light having undergone the adjustment of the illuminance distribution and the polarization directions is incident to the color separation optical system 320. The color separation optical system 320 separates the incident light into three color light beams including red light (R), green light (G), and blue light (B). The three color light beams are respectively modulated according to video signals by the liquid crystal light valves 330R, 330G and 330E which correspond to the respective color light beams. The liquid crystal light valves 330R, 330G and 330E respectively include liquid crystal panels 560R, 560G and 560B which will be described later, and polarization plates (not illustrated). The polarization plates are disposed on a light incidence side and a light emission side of each of the liquid crystal panels 560R, 560G and 560B.

The three modulated color light beams are combined with each other by the cross dichroic prism 340. The combined light is incident to the projection optical system 350. The projection optical system 350 projects the incident light onto a screen 700 (refer to FIG. 3). Thus, a video is displayed on the screen 700. In addition, well-known configurations may be employed as configurations of the collimating lens 305, the illumination optical system 310, the color separation optical system 320, the cross dichroic prism 340, and the projection optical system 350.

Figure 2:
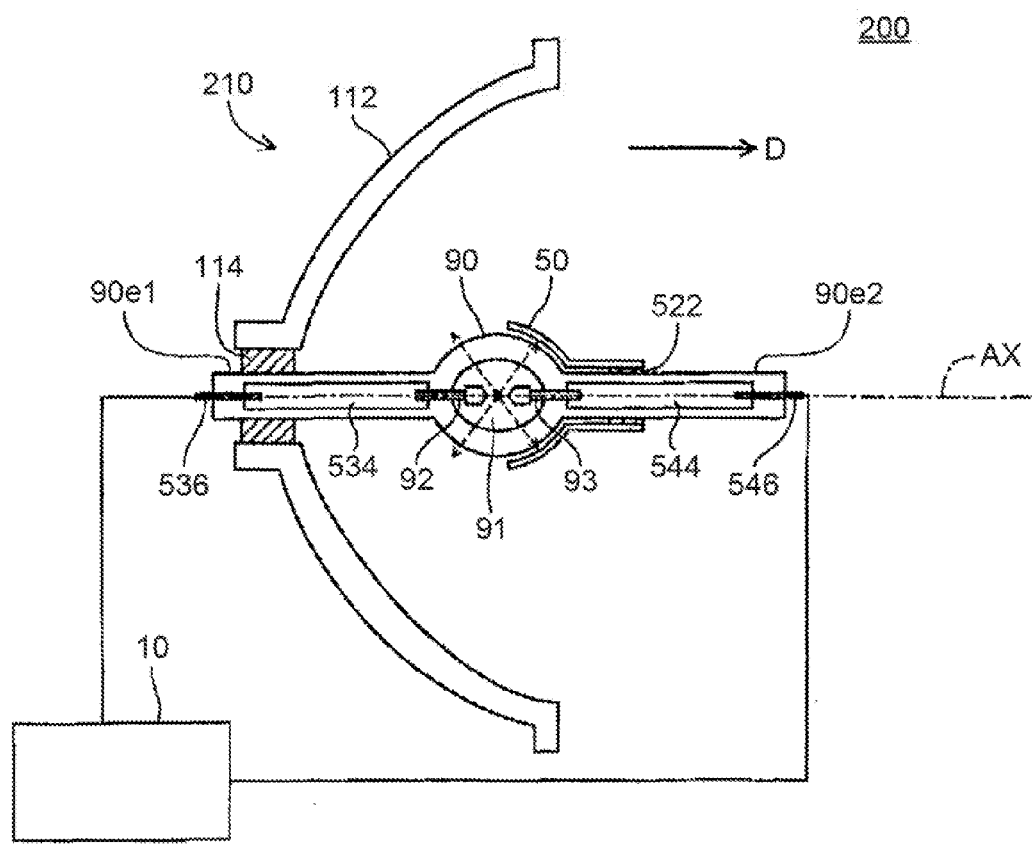
FIG. 2 is a sectional view illustrating a discharge lamp in the first embodiment.

FIG. 2 is a sectional view illustrating a configuration of the light source apparatus 200. The light source apparatus 200 includes a light source unit 210 and a discharge lamp lighting device (discharge lamp driving device) 10. FIG. 2 shows a sectional view of the light source unit 210. The light source unit 210 includes a main reflection mirror 112, a discharge lamp 90, and a subsidiary reflection mirror 50.

The discharge lamp lighting device 10 supplies driving power (driving current) to the discharge lamp 90 so as to light the discharge lamp 90. The main reflection mirror 112 reflects light emitted from the discharge lamp 90 in an irradiation direction D. The irradiation direction D is parallel to an optical axis AX of the discharge lamp 90.

The discharge lamp 90 has a rod shape extending in the irradiation direction D. One end of the discharge lamp 90 is referred to as a first end 90$e$1, and the other end of the discharge lamp 90 is referred to as a second end 90$e$2. A material of the discharge lamp 90 is, for example, a light transmissive material such as quartz glass. A central portion of the discharge lamp 90 is swollen in a spherical shape, and the inside thereof is a discharge space 91. A gas which is a discharge medium containing rare gases, metal halogen compounds, and the like is enclosed in the discharge space 91.

Tips of a first electrode 92 and a second electrode 93 protrude in the discharge space 91. The first electrode 92 is disposed on the first end 90$e$1 side of the discharge space 91. The second electrode 93 is disposed on the second end 90$e$2 side of the discharge space 91. Each of the first electrode 92 and the second electrode 93 has a rod shape extending in the optical axis AX. The tips of the first electrode 92 and the second electrode 93 are disposed to face each other with a predetermined distance in the discharge space 91. A material of each of the first electrode 92 and the second electrode 93 is, for example, a metal such as tungsten.

A first terminal 536 is provided at the first end 90$e$1 of the discharge lamp 90. The first terminal 536 and the first electrode 92 are electrically connected to each other via a conductive member 534 which penetrates through the discharge lamp 90. Similarly, a second terminal 546 is provided at the second end 90$e$2 of the discharge lamp 90. The second terminal 546 and the second electrode 93 are electrically connected to each other via a conductive member 544 which penetrates through the discharge lamp 90. A material of each of the first terminal 536 and the second terminal 546 is, for example, a metal such as tungsten. As a material of each of the conductive members 534 and 544, for example, a molybdenum foil is used.

The first terminal 536 and the second terminal 546 are connected to the discharge lamp lighting device 10. The discharge lamp lighting device 10 supplies the driving power Wd for driving the discharge lamp 90 to the first terminal 536 and the second terminal 546. As a result, arc discharge occurs between the first electrode 92 and the second electrode 93. Light (discharge light) occurring due to the arc discharge is radiated in all directions from the discharge position as indicated by dashed arrows.

The main reflection mirror 112 is fixed to the first end 90e1 of the discharge lamp 90 via a fixation member 114. The main reflection mirror 112 reflects light which travels toward an opposite side to the irradiation direction D among discharge light beams, in the irradiation direction D. A shape of a reflection surface (a surface on the discharge lamp 90 side) of the main reflection mirror 112 is not particularly limited within a range in which discharge light can be reflected in the irradiation direction D, and may be, for example, a spheroidal shape or a rotating parabolic shape. For example, in a case where a shape of the reflection surface of the main reflection mirror 112 is a rotating parabolic shape, the main reflection mirror 112 can convert discharge light into light which is substantially parallel to the optical axis AX. Consequently, the collimating lens 305 can be omitted.

The subsidiary reflection mirror 50 is fixed to the second end 90e2 side of the discharge lamp 90 via a fixation member 522. A shape of a reflection surface (a surface on the discharge lamp 90 side) of the subsidiary reflection mirror 50 is a spherical shape which surrounds a portion of the discharge space 91 on the second end 90e2 side. The subsidiary reflection mirror 50 reflects light which travels toward an opposite side to the side on which the main reflection mirror 112 is disposed among the discharge light beams, toward the main reflection mirror 112. Consequently, it is possible to increase usage efficiency of the light radiated from the discharge space 91.

A material of each of the fixation members 114 and 522 is not particularly limited as long as the material is a heat resistant material which can resist heat generated from the discharge lamp 90, and is, for example, an inorganic adhesive. A method of fixing the main reflection mirror 112, the subsidiary reflection mirror 50, and the discharge lamp 90 to each other is not limited to a method in which the main reflection mirror 112 and the subsidiary reflection mirror 50 are fixed to the discharge lamp 90, and may employ any method. For example, the discharge lamp 90 and the main reflection mirror 112 may be separately fixed to a casing (not illustrated) of the projector 500. This is also the same for the subsidiary reflection mirror 50.

Hereinafter, a circuit configuration of the projector 500 will be described.

Figure 3:
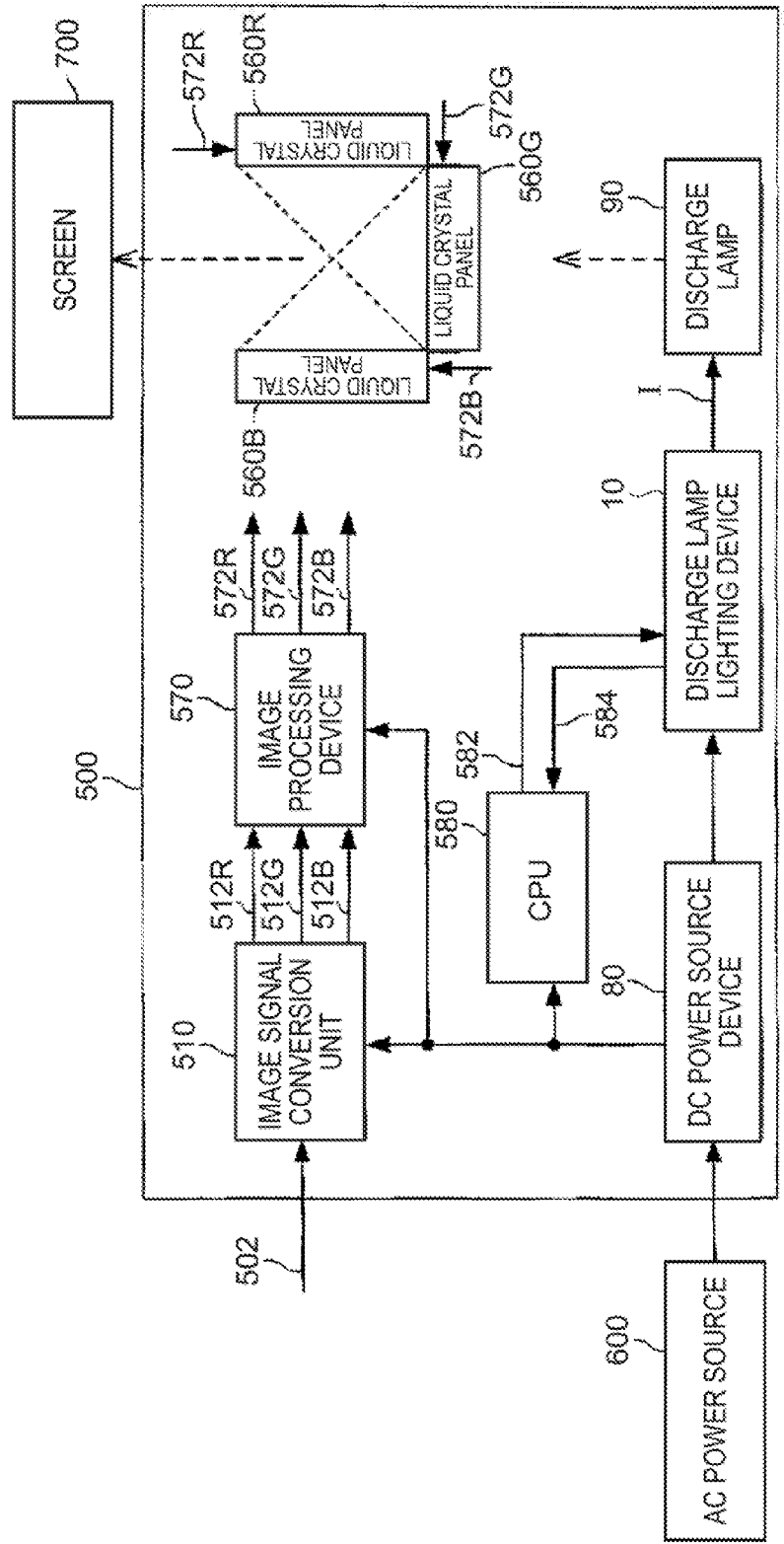
FIG. 3 is a block diagram illustrating various constituent elements of the projector according to the first embodiment.

FIG. 3 is a diagram illustrating an example of a circuit configuration of the projector 500 according to the present embodiment. The projector 500 includes an image signal conversion unit 510, a DC power source device 80, the liquid crystal panels 560R, 560G and 560B, an image processing device 570, and a central processing unit (CPU) 580, in addition to the optical systems illustrated in FIG. 1.

The image signal conversion unit 510 converts image signals 502 (luminance-color difference signals, analog RGB signals, or the like) which are input from an external device into digital RGB signals with a predetermined word length so as to generate image signals 512R, 512G and 512B which are then supplied to the image processing device 570.

The image processing device 570 performs an image process on each of the three image signals 512R, 512G and 512B. The image processing device 570 supplies driving signals 572R, 572G and 572B for respectively driving the liquid crystal panels 560R, 560G and 560B, to the liquid crystal panels 560R, 560G and 560B.

The DC power source device 80 converts an AC voltage supplied from an external AC power source 600 into a constant DC voltage. The DC power source device 80 supplies DC voltages to the image signal conversion unit 510 and the image processing device 570 located on a secondary side of a transformer (not illustrated but included in the DC power source device 80) and the discharge lamp lighting device 10 located on a primary side of the transformer.

The discharge lamp lighting device 10 generates a high voltage between the electrodes of the discharge lamp 90 so as to cause dielectric breakdown and thus form a discharge path during activation. Thereafter, the discharge lamp lighting device 10 supplies a driving current I for the discharge lamp 90 to maintain discharge.

The liquid crystal panels 560R, 560G and 560B are respectively provided in the above-described liquid crystal light valves 330R, 330G and 330B. The liquid crystal panels 560R, 560G and 560B modulate transmittance (luminance) of the color light beams which are respectively incident to the liquid crystal panels 560R, 560G and 560B via the above-described optical systems on the basis of the respective driving signals 572R, 572G and 572B.

The CPU 580 controls various operations from starting of lighting of the projector 500 to putting-out thereof. For example, in the example illustrated in FIG. 3, a lighting command or a putting-out command is output to the discharge lamp lighting device 10 via a communication signal 582. The CPU 580 receives lighting information of the discharge lamp 90 from the discharge lamp lighting device 10 via a communication signal 584.

Hereinafter, a description will be made of a configuration of the discharge lamp lighting device 10.

Figure 4:
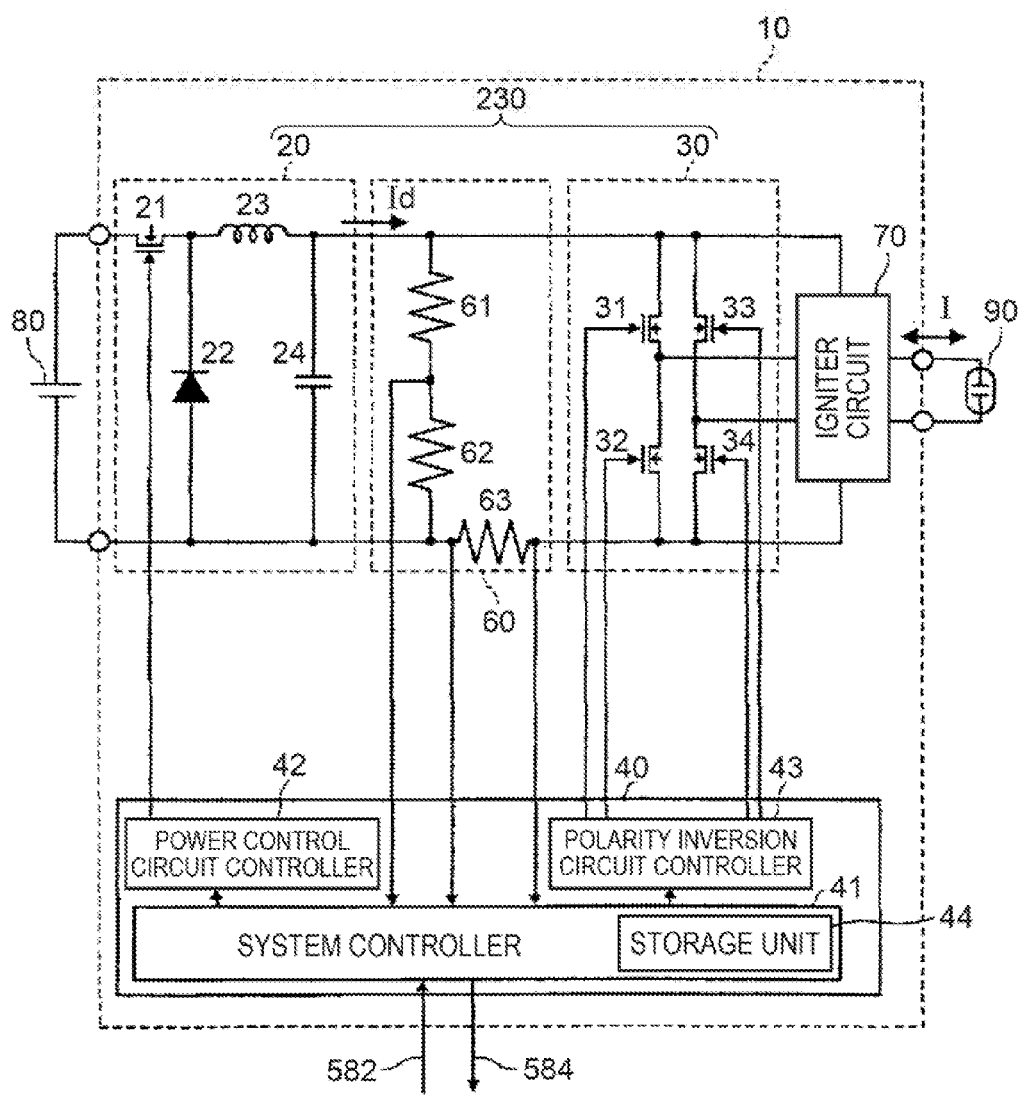
FIG. 4 is a circuit diagram illustrating a discharge lamp lighting device according to the first embodiment.

FIG. 4 is a diagram illustrating an example of a circuit configuration of the discharge lamp lighting device 10.

The discharge lamp lighting device 10 includes, as illustrated in FIG. 4, a power control circuit 20, a polarity inversion circuit 30, a controller 40, an operation detection unit (voltage detection circuit) 60, and an igniter circuit 70.

The power control circuit 20 generates the driving power Wd which is supplied to the discharge lamp 90. In the present embodiment, the power control circuit 20 is constituted of a down chopper circuit which receives a voltage from the DC power source device 80 and outputs a DC current Id by stepping down the input voltage.

The power control circuit 20 is configured to include a switch element 21, a diode 22, a coil 23, and a capacitor 24. The switch element 21 is constituted of, for example, a transistor. In the present embodiment, one end of the switch element 21 is connected to a positive voltage side of the DC power source device 80, and the other end thereof is connected to a cathode terminal of the diode 22 and one end of the coil 23.

One end of the capacitor 24 is connected to the other end of the coil 23, and the other end of the capacitor 24 is connected to an anode terminal of the diode 22 and a negative voltage side of the DC power source device 80. A current control signal is input to a control terminal of the switch element 21 from the controller 40 which will be described later, and thus turning-on and turning-off of the switch element 21 are controlled. As the current control signal, for example, a pulse width modulation (PWM) control signal may be used.

If the switch element 21 is turned on, a current flows through the coil 23, and thus energy is accumulated in the coil 23. Thereafter, if the switch element 21 is turned off, the energy accumulated in the coil 23 is released along a path passing through the capacitor 24 and the diode 22. As a result, the DC current Id is generated which is proportional to a time period in which the switch element 21 is turned on.

The polarity inversion circuit 30 inverts a polarity of the DC current Id which is input from the power control circuit 20, at a predetermined timing. Consequently, the polarity inversion circuit 30 generates and outputs a driving current I as a. DC which is continuously maintained only for a controlled time period, or a driving current I as an AC which has any frequency. In the present embodiment, the polarity inversion circuit 30 is constituted of an inverter bridge circuit (full bridge circuit).

The polarity inversion circuit 30 includes, for example, a first switch element 31, a second switch element 32, a third switch element 33, and a fourth switch element 34, constituted of transistors. The polarity inversion circuit 30 has a configuration in which the first switch element 31 and the second switch element 32 which are connected in series to each other are connected in parallel to the third switch element 33 and the fourth switch element 34 which are connected in series to each other. A polarity inversion control signal is input from the controller 40 to each of control terminals of the first switch element 31, the second switch element 32, the third switch element 33, and the fourth switch element 34. Turning-on and turning-off operations of each of the first switch element 31, the second switch element 32, the third switch element 33, and the fourth switch element 34 are controlled on the basis of the polarity inversion control signal.

In the polarity inversion circuit 30, an operation is repeatedly performed in which the first switch element 31 and the fourth switch element 34, and the second switch element 32 and the third switch element 33 are alternately turned on or off. Therefore, the polarities of the DC current Id output from the power control circuit 20 are alternately inverted. The polarity inversion circuit 30 generates and outputs a driving current I as a DC which is continuously maintained in the same polarity state only for a controlled time period or a driving current I as an AC having a controlled frequency, from a common connection point between the first switch element 31 and the second switch element 32, and a common connection point between the third switch element 33 and the fourth switch element 34.

In other words, in the polarity inversion circuit 30, the second switch element 32 and the third switch element 33 are controlled to be turned off when the first switch element 31 and the fourth switch element 34 are turned on, and the second switch element 32 and the third switch element 33 are controlled to be turned on when the first switch element 31 and the fourth switch element 34 are turned off. Thus, the driving current I is generated which flows in order of the first switch element 31, the discharge lamp 90, and the fourth switch element 34 from one end of the capacitor 24 when the first switch element 31 and the fourth switch element 34 are turned on. The driving current I is generated which flows in order of the third switch element 33, the discharge lamp 90, and the second switch element 32 from one end of the capacitor 24 when the second switch element 32 and the third switch element 33 are turned on.

In the present embodiment, the portion including the power control circuit 20 and the polarity inversion circuit 30 corresponds to a discharge lamp driving unit 230. In other words, the discharge lamp driving unit 230 supplies the driving current I (driving power) for driving the discharge lamp 90 to the discharge lamp 90.

The controller 40 controls the discharge lamp driving unit 230. In the example illustrated in FIG. 4, the controller 40 controls the power control circuit 20 and the polarity inversion circuit 30 so as to control parameters such as a duration in which the driving current I is continuously maintained to have the same polarity, and a current value (a power value of the driving power Wd) and a frequency of the driving current I. The controller 40 performs polarity inversion control for controlling the duration in which the driving current I is continuously maintained to have the same polarity, a frequency of the driving current I, and the like, on the polarity inversion circuit 30, on the basis of a polarity inversion timing. The controller 40 performs current control for controlling a current value of the output DC current Id on the power control circuit 20.

A configuration of the controller 40 is not particularly limited. In the present embodiment, the controller 40 is configured to include a system controller 41, a power control circuit controller 42, and a polarity inversion circuit controller 43. Some or all of the controller 40 may be configured by using semiconductor integrated circuits.

The system controller 41 controls the power control circuit controller 42 and the polarity inversion circuit controller 43 so as to control the power control circuit 20 and the polarity inversion circuit 30. The system controller 41 may control the power control circuit controller 42 and the polarity inversion circuit controller 43 on the basis of a lamp voltage (a voltage between the electrodes) Vla and a driving current I detected by the operation detection unit 60.

In the present embodiment, the system controller 41 is configured to include a storage unit 44. The storage unit 44 may be provided separately from the system controller 41.

The system controller 41 may control the power control circuit 20 and the polarity inversion circuit 30 on the basis of information stored in the storage unit 44. The storage unit 44 may store, for example, information regarding driving parameters such as the duration in which the driving current I is continuously maintained to have the same polarity, a current value, a frequency, a waveform, and a modulation pattern of the driving current T.

The power control circuit controller 42 outputs a current control signal to the power control circuit 20 on the basis of a control signal from the system controller 41, so as to control the power control circuit 20.

The polarity inversion circuit controller 43 outputs a polarity inversion control signal to the polarity inversion circuit 30 on the basis of a control signal from the system controller 41, so as to control the polarity inversion circuit 30.

The controller 40 may be implemented by using a dedicated circuit so as to perform the above-described control or various control operations related to processes to be described later. In contrast, the controller 40 functions as a computer, for example, by the CPU executing a control program stored in the storage unit 44, so as to perform various control operations related to such processes.

Figure 5:
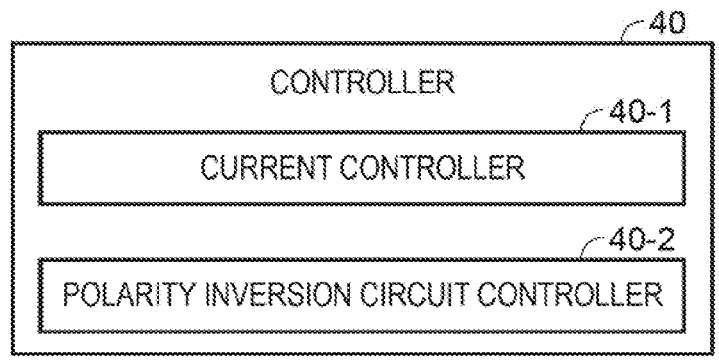
FIG. 5 is a block diagram illustrating a configuration example of a controller according to the first embodiment.

FIG. 5 is a diagram illustrating another configuration example of the controller 40. As illustrated in FIG. 5, the controller 40 may be configured to function as a current controller 40-1 which controls the power control circuit 20 and a polarity inversion circuit controller 40-2 which controls the polarity inversion circuit 30 according to the control program.

In the example illustrated in FIG. 4, the controller 40 is configured as a part of the discharge lamp lighting device 10. In contrast, the CPU 580 may be configured to realize some of the functions of the controller 40.

In the present embodiment, the operation detection unit 60 includes a voltage detection portion which detects a lamp voltage of the discharge lamp 90 and outputs lamp voltage information to the controller 40. The operation detection unit 60 may include a current detection portion or the like which detects the driving current I and outputs driving current information to the controller 40. In the present embodiment, the operation detection unit 60 is configured to include a first resistor 61, a second resistor 62, and a third resistor 63.

In the present embodiment, the voltage detection portion of the operation detection unit 60 detects the lamp voltage Vla on the basis of a voltage divided by the first resistor 61 and the second resistor 62 which are connected in parallel to the discharge lamp 90 and are connected in series to each other. In addition, in the present embodiment, the current detection portion detects the driving current I on the basis of a voltage occurring at the third resistor 63 which is connected in series to the discharge lamp 90.

The igniter circuit 70 operates only at the time of starting of lighting of the discharge lamp 90. The igniter circuit 70 supplies a high voltage (a voltage higher than at normal lighting of the discharge lamp 90) which is necessary to cause dielectric breakdown between the electrodes (between the first electrode 92 and the second electrode 93) of the discharge lamp 90 and thus form a discharge path, between the electrodes of the discharge lamp 90 (between the first electrode 92 and the second electrode 93) at the time of starting of lighting of the discharge lamp 90. In the present embodiment, the igniter circuit 70 is connected in parallel to the discharge lamp 90.

Figure 6A:
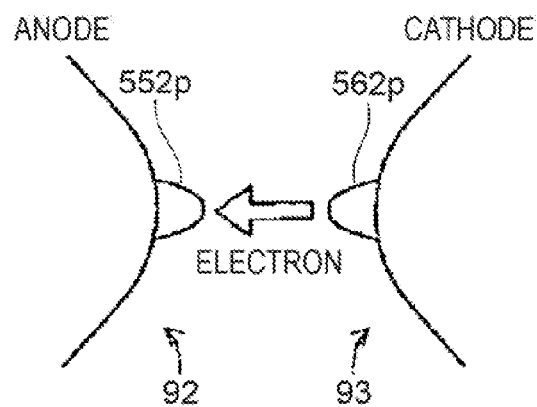
FIG. 6A is a diagram illustrating states of protrusions of electrode tips of the discharge lamp.
Figure 6B:
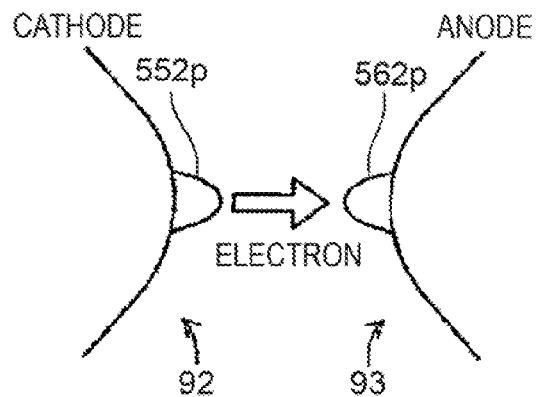

FIGS. 6A and 6B illustrate the tips of the first electrode 92 and the second electrode 93. Protrusions 552p and 562p are respectively formed at the tips of the first electrode 92 and the second electrode 93. Discharge occurring between the first electrode 92 and the second electrode 93 mainly occurs between the protrusion 552p and the protrusion 562p. In a case where the protrusions 552p and 562p are provided as in the present embodiment, movements of discharge positions (arc positions) at the first electrode 92 and the second electrode 93 can be minimized compared with a case where no protrusions are provided.

FIG. 6A illustrates a first polarity state in which the first electrode 92 operates as an anode, and the second electrode 93 operates as a cathode. In the first polarity state, electrons move from the second electrode 93 (cathode) to the first electrode 92 (anode) due to discharge. The electrons are emitted from the cathode (second electrode 93). The electrons emitted from the cathode (second electrode 93) collide with the tip of the anode (first electrode 92). Heat is generated due to the collision, and thus the temperature of the tip (protrusion 552p) of the anode (first electrode 92) increases.

FIG. 63 illustrates a second polarity state in which the first electrode 92 operates as a cathode, and the second electrode 93 operates as an anode. Contrary to the first polarity state, in the second polarity state, electrons move from the first electrode 92 to the second electrode 93. As a result, the temperature of the tip (protrusion 562p) of the second electrode 93 increases.

As mentioned above, when the driving current I is supplied to the discharge lamp 90, the temperature of the anode with which the electrons collide increases. On the other hand, the temperature of the cathode which emits the electrons decreases during emission of the electrons toward the anode.

Next, a description will be made of a case where the controller 40 controls the discharge lamp driving unit 230.

Figure 7:
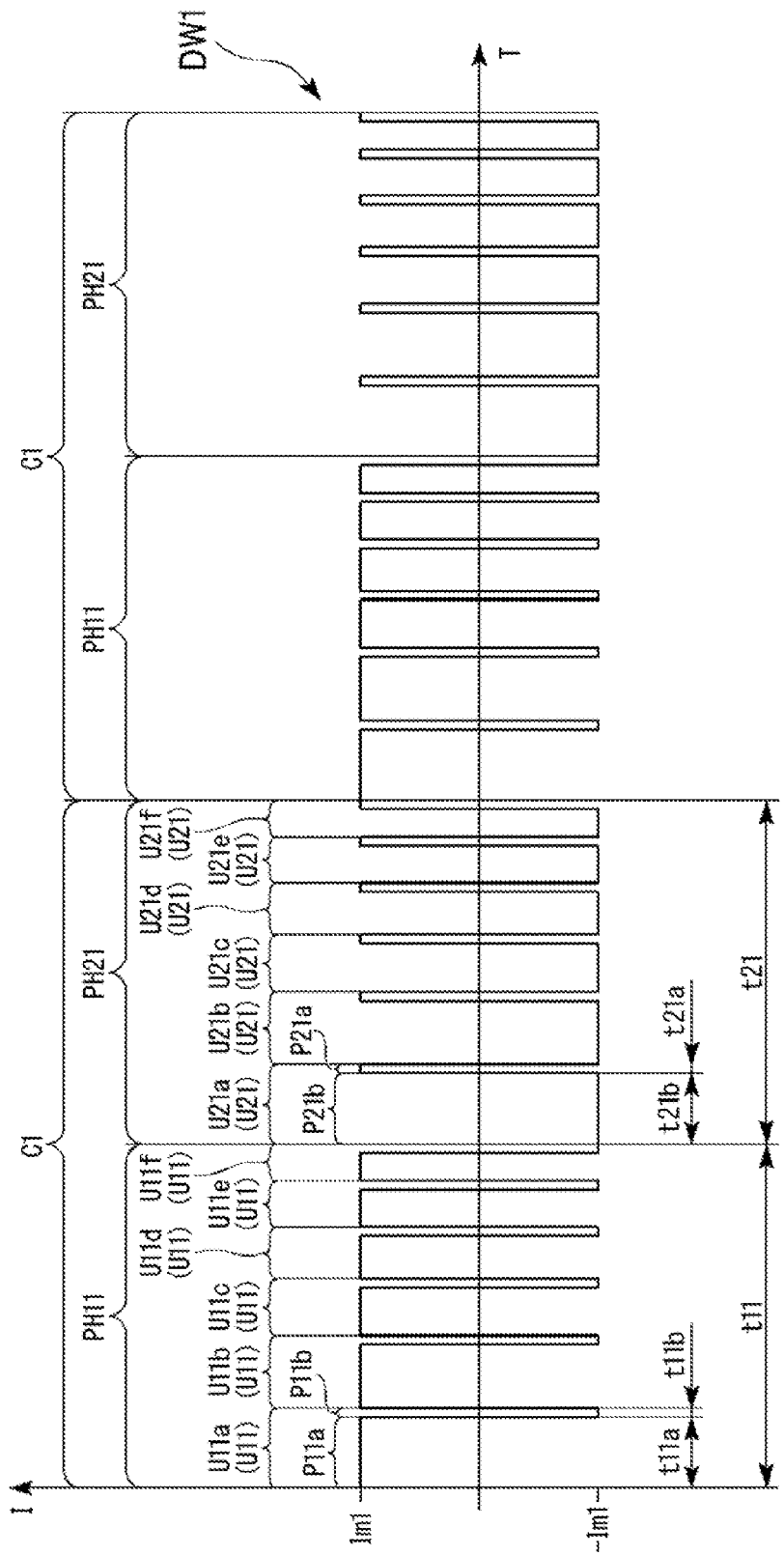
FIG. 7 is a diagram illustrating a driving current waveform according to the first embodiment.

FIG. 7 is a diagram illustrating a driving current waveform DW1 of the driving current I supplied to the discharge lamp 90 of the present embodiment. In FIG. 7, a longitudinal axis expresses the driving current I, and a transverse axis expresses time T.

In the present embodiment, the controller 40 controls the discharge lamp driving unit 230 according to the driving current waveform DW1 illustrated in FIG. 7.

Driving Current Waveform

As illustrated in FIG. 7, the driving current waveform DW1 is formed of a plurality of consecutive control cycles C1. The control cycle C1 includes a first AC period PH11 and a second AC period PH21. In other words, the driving current waveform DW1 (driving current I) includes the first AC period PH11 and the second AC period PH21. The first AC period PH11 and the second AC period PH21 are periods in which an AC current whose polarity is inverted between a current value Im1 and a current value −Im1 is supplied to the discharge lamp 90 as the driving current I.

AC Periods

The first AC period PH11 is a period in which the first electrode 92 is heated. The first AC period PH11 includes a plurality of consecutive first unit driving periods U11 each of which is formed of a first polarity period P11a in which the first electrode 92 serves as an anode and a second polarity period P11b in which the second electrode 93 serves as an anode. In the present embodiment, the first AC period PH11 is formed of, for example, six first unit driving periods U11, that is, a first unit driving period U11a, a first unit driving period U11b, a first unit driving period U11c, a first unit driving period U11d, a first unit driving period U11e, and a first unit driving period U11f which are continuously provided in this order.

The second AC period PH21 is a period in which the second electrode 93 is heated. The second AC period PH21 includes a plurality of consecutive second unit driving periods U21 each of which is formed of a first polarity period P21a in which the first electrode 92 serves as an anode and a second polarity period P21b in which the second electrode 93 serves as an anode. In the present embodiment, the second AC period PH21 is formed of, for example, six second unit driving periods U21, that is, a second unit driving period U21a, a second unit driving period U21b, a second unit driving period U21c, a second unit driving period U21d, a second unit driving period U21e, and a second unit driving period U21f which are continuously provided in this order.

In the driving current waveform DW1 of the present embodiment, the first AC period PH11 and the second AC period PH21 have the same waveform except that polarities are inverted. In other words, a length t11a of the first polarity period P11a in each of the first unit driving periods U11a to U11f is the same as a length t21b of the second polarity period P21b in each of the second unit driving periods U11a to U21f. A length t11b of the second polarity period P11b in each of the first unit driving periods U11a to U11f is the same as a length t21a of the first polarity period P21a in each of the second unit driving periods U21a to U21f.

For this reason, in the present embodiment, a length t11 of the first AC period PH11 is the same as a length t21 of the second AC period PH21.

In the present embodiment, each of the length t11 of the first AC period PH11 and the length t21 of the second AC period PH21 is set to, for example, 5.0 milliseconds (ms) or more. Through the setting in the above-described way, it is possible to improve a melting amount of the protrusion 552p and the protrusion 562p of the first electrode 92 and the second electrode 93.

In the present specification, lengths of two periods being the same as each other includes not only a case where the lengths of the two periods are exactly the same as each other but also a case where a ratio between the lengths of the two periods is about 0.9 or more and about 1.1 or less.

As described above, in the present embodiment, the first AC period PH11 and the second AC period PH21 have the same waveform except that polarities are inverted, and, thus, in the following description, only the first AC period PT-Ill will be described as a representative thereof in some cases.

Unit Driving Period

In the first unit driving period U11 of the first AC period PH11, a ratio of the length t11a of the first polarity period P11a to the length t11b of the second polarity period P11b is more than 1. In other words, in the first unit driving period U11, a ratio (duration ratio) of a duration in which the first polarity is maintained to a duration in which the second polarity is maintained is set to be equal to or more than a predetermined value X (X>1). For this reason, in the first unit driving period U11, the length t11a of the first polarity period P11a is larger than the length t11b of the second polarity period P11b. In other words, the t11a of the first polarity period P11a is different from the length t11b of the second polarity period P11b.

In the following description, a ratio of a length of a longer polarity period to a length of a shorter polarity period of the first polarity period and the second polarity period in the unit driving period will be referred to as a duration ratio in some cases.

Consequently, in the first AC period PH11 in which a plurality of first unit driving periods U11 are continuously provided, a sum of the lengths t11a of the first polarity periods P11a is larger than a sum of the lengths t11b of the second polarity periods P11b. Therefore, in the first AC period PH11, the first electrode 92 serving as an anode in the first polarity period P11a is heated.

In the present embodiment, for example, the predetermined value X is set to 3.0 or greater. In other words, a ratio (duration ratio) of the length t11a of the first polarity period P11a to the length t11b of the second polarity period P11b in the first AC period PH11 is 3.0 or more.

Through the setting in the above-described way, it is possible to minimize a decrease in the temperature of an electrode opposite to a heated electrode, that is, the temperature of the second electrode 93 in the first AC period PH11, and also to further improve a melting amount of the first electrode 92 heated in the first AC period PH11.

In the present embodiment, lengths of the respective first unit driving periods U11a to U11f are different from each other. Consequently, in the present embodiment, lengths of the first unit driving periods U11 which are temporally adjacent to each other are different from each other. In the present embodiment, lengths of the respective second unit driving periods U21a to U21f are different from each other. Consequently, in the present embodiment, lengths of the second unit driving periods U21 which are temporally adjacent to each other are different from each other.

In the present embodiment, for example, the length t11a of the first polarity period P11a in each of the first unit driving periods U11 is equal to or more than 1.0 millisecond (ms). In other words, the length t11a of the first polarity period P11a is equal to or more than a length of a half cycle of an AC current of 500 Hz.

Through the setting in the above-described way, it is possible to improve a melting amount of the protrusion 552p at the tip of the first electrode 92.

The length t11a of the first polarity period P11a in the first unit driving period U11 is preferably equal to or less than 5.0 milliseconds (ms), that is, equal to or less than a length of a half cycle of an AC current of 100 Hz. This is because it is possible to effectively minimize a decrease in the temperature of the second electrode 93 which is a cathode in the first polarity period P11a.

In the present embodiment, for example, the lengths t11a of the first polarity periods P11a which are respectively included in the first unit driving periods U11a to U11f are different from each other. Consequently, in the first AC period PH11, the lengths t11a of the first polarity periods P11a which are temporally adjacent to each other with the second polarity period P11b interposed therebetween are different from each other. In the present embodiment, for example, the lengths t21b of the second polarity periods P21b which are respectively included in the second unit driving periods U21a to U21f are different from each other. Consequently, in the second AC period PH21, the lengths t21b of the second polarity periods P21b which are temporally adjacent to each other with the first polarity period P21a interposed therebetween are different from each other.

In the present embodiment, the length t11b of the second polarity period P11b in the first unit driving period U11 is equal to or more than, for example, about 0.16 milliseconds (ms), and is less than 1.0 millisecond (ms). In other words, the length t11b of the second polarity period P11b is equal to or more than a length of a half cycle of an AC current of 3 kHz, and is less than a length of a half cycle of an AC current of 500 Hz.

Through the setting in the above-described way, it is possible to minimize a decrease in the temperature of the second electrode 93 and also to further improve a melting amount of the first electrode 92 in the first AC period PH11.

Table 1 shows examples of the length t11a of the first polarity period P11a and the length t11b of the second polarity period P11b of the first unit driving periods U11 in the first AC period PH11. Table 1 also illustrates a ratio of the length t11a of the first polarity period Pile to the length t11b of the second polarity period P11b, that is, a duration ratio of the duration of the first polarity to the duration of the second polarity.

TABLE 1

| First unit driving periods U11 | Length t11a (ms) of first polarity period | Length t11b (ms) of second polarity period | Duration ratio (length t11a of first polarity period/length t11b of second polarity period) |
| --- | --- | --- | --- |
| U11a | 2.15 | 0.35 | 6.14 |
| U11b | 1.93 | 0.4 | 4.83 |
| U11c | 1.77 | 0.45 | 3.93 |
| U11d | 1.6 | 0.45 | 3.56 |
| U11e | 1.43 | 0.4 | 3.58 |
| U11f | 1.26 | 0.35 | 3.60 |

In Table 1, as an example, the length t11a of the first polarity period P11a is set to be reduced in order of the first unit driving period U11a to the first unit driving period U11f. In other words, in the first AC period PH11, the lengths t11a of the plurality of first polarity periods P11a are set to decrease as the first polarity periods P11a are provided temporally later. In the present embodiment, in the second AC period PH21, the lengths t21b of the plurality of second polarity periods P21b are set to decrease as the second polarity periods P21b are provided temporally later.

In the second unit driving periods U21 of the second AC period PH21, a ratio of the length t21b of the second polarity period P21b to the length t21a of the first polarity period P21a is more than 1, in the same manner as in the first unit driving periods U11. In other words, in the second unit driving period U21, a duration ratio of a duration in which the second polarity is maintained to a duration in which the first polarity is maintained is set to be equal to or more than a predetermined value X (X>1). For this reason, in the second unit driving period U21, the length t21b of the second polarity period P21b is larger than the length t21a of the first polarity period P21a.

Consequently, in the second AC period PH21 in which a plurality of second unit driving periods U21 are continuously provided, a sum of the lengths t21b of the second polarity periods P21b is larger than a sum of the lengths t21a of the first polarity periods P21a. Therefore, in the second AC period PH21, the second electrode 93 serving as an anode in the second polarity period P21b is heated.

As described above, in the present embodiment, the predetermined value X is set to 3.0 or greater. In other words, a ratio (duration ratio) of the length t21b of the second polarity period P21b to the length t21a of the first polarity period P21a in the second AC period PH21 is 3.0 or more.

Through the setting in the above-described way, it is possible to minimize a decrease in the temperature of the first electrode 92 and also to further improve a melting amount of the second electrode 93 in the second AC period PH21.

In the present embodiment, for example, the length t21b of the second polarity period P21b in each of the second unit driving periods U21 is 1.0 millisecond (ms) or more in the same manner as the length t11a of the first polarity period P11a in each of the first unit driving periods U11.

Through the setting in the above-described way, it is possible to improve a melting amount of the protrusion at the tip of the electrode on a heat side.

The length t21b of the second polarity period P21b in the second unit driving period U21 is preferably equal to or less than 5.0 milliseconds (ms), that is, equal to or less than a length of a half cycle of an AC current of 100 Hz, in the same manner as the length t11a of the first polarity period P11a in the first unit driving period U11. This is because it is possible to effectively minimize a decrease in the temperature of the first electrode 92 which is a cathode in the second polarity period P21b.

In the present embodiment, the length t21a of the first polarity period P21a in the second unit driving period U21 is equal to or more than, for example, about 0.16 milliseconds (ms), and is less than 1.0 millisecond (ms) in the same manner as the length t11b of the second polarity period P11b in the first unit driving period U11.

As described above, the controller 40 of the present embodiment controls the discharge lamp driving unit 230 so that the driving current I corresponding to each period is supplied to the discharge lamp 90 according to the driving current waveform DW1.

The control on the discharge lamp driving unit 230 performed by the controller 40 may be expressed as a discharge lamp driving method. In other words, a discharge lamp driving method of the present embodiment includes driving the discharge lamp 90 by supplying the driving current I to the discharge lamp 90 including the first electrode 92 and the second electrode 93, in which the driving current I includes the first AC period PH11 in which an AC current is supplied to the discharge lamp 90 and the second AC period PH21 in which an AC current is supplied to the discharge lamp 90, in which the first AC period PH11 includes a plurality of consecutive first unit driving periods U11 each of which is formed of the first polarity period P11a in which the first electrode 92 serves as an anode and the second polarity period P11b in which the second electrode 93 serves as an anode, and the second AC period PH21 includes a plurality of consecutive second unit driving periods U21 each of which is formed of the first polarity period P21a and the second polarity period P21b, and in which a ratio of the length t11a of the first polarity period P11a to the length t11b of the second polarity period P11b is more than 1 in each of the first unit driving periods U11, and a ratio of the length t21b of the second polarity period P21b to the length t21a of the first polarity period P21a is more than 1 in each of the second unit driving periods U21.

According to the present embodiment, a ratio of the length t11a of the first polarity period P11a to the length t11b of the second polarity period P11b is more than 1 in each of the first unit driving periods U11 included in the first AC period PH11. For this reason, in the first AC period PH11, a sum of the lengths t11a of the first polarity periods P11a is larger than a sum of the lengths t11b of the second polarity periods P11b, and thus it is possible to improve a melting amount of the protrusion 552p of the first electrode 92 serving as an anode in the first polarity period P11a.

On the other hand, the second polarity period P11b which is shorter than the first polarity period P11a and in which an opposite polarity occurs is provided in each of the plurality of first unit driving periods U11 included in the first AC period PH11, and thus it is possible to minimize a decrease in the temperature of the second electrode 93 serving as an anode in the second polarity period P11b. Consequently, it is possible to prevent the protrusion 562p of the second electrode 93 from being deformed and thus to minimize the occurrence of flickering. This is also the same for the second AC period PH21 except that the polarity is inverted.

Therefore, according to the present embodiment, since a melting amount of the protrusion at the tip of the electrode on the heated side can be improved, and the protrusion at the tip of the electrode on the opposite side to the heated side can be prevented from being deformed so that the occurrence of flickering is minimized, it is possible to provide the discharge lamp driving device capable of improving the lifespan of the discharge lamp 90.

According to the present embodiment, since the predetermined value X is set to be equal to or greater than 3.0, in other words, a ratio of the length t11a of the first polarity period P11a to the length t11b of the second polarity period P11b is equal to or more than 3.0, it is possible to minimize a decrease in the temperature of the second electrode 93 and also to improve a melting amount of the protrusion 552p of the first electrode 92 in the first AC period PH11.

Therefore, since it is possible to minimize the occurrence of flickering due to deformation of the protrusion 562p of the second electrode 93 and also to cause the protrusion 552p of the first electrode 92 to be melted and to grow, a shape of the protrusion 552p can be maintained to be thick.

According to the present embodiment, the length of the first polarity period P11a in the first unit driving period U11 is equal to or more than 1.0 millisecond (ms). For this reason, time required for heating the first electrode 92 in the first AC period PH11 can be sufficiently lengthened, and thus the first electrode 92 can be appropriately melted.

According to the present embodiment, the length t11b of the second polarity period P11b in the first unit driving period U11 is equal to or more than 0.16 milliseconds (ms) and is less than 1.0 millisecond (ms). Consequently, it is possible to minimize a decrease in the temperature of the second electrode 93 and also to improve a melting amount of the first electrode 92 in the first AC period PH11.

According to the present embodiment, the length t11 of the first AC period PH11 is set to be equal to or more than 5.0 milliseconds (ms). Consequently, it is possible to appropriately melt the first electrode 92.

According to the present embodiment, the length t11 of the first AC period PH11 is set to be the same as the length t21 of the second AC period PH21. Therefore, it is possible to heat and melt the first electrode 92 and the second electrode 93 with good balance.

According to the present embodiment, the lengths of the first unit driving periods U11 which are temporally adjacent to each other are the same as each other, and thus switching timings between the first polarity and the second polarity are irregular. Thus, it is possible to minimize the occurrence of noise due to interference between overshoot of the driving current I caused by switching between the first polarity and the second polarity, and the liquid crystal panels 560R, 560G and 560B of the projector 500. In the present embodiment, the lengths of the second unit driving periods U21 which are temporally adjacent to each other are also different from each other, and thus it is possible to minimize the occurrence of noise due to interference between overshoot of the driving current I and the liquid crystal panels 560R, 560G and 560B in both of the first AC period PH11 and the second AC period PH21.

According to the present embodiment, the lengths of the first polarity periods P11a which are adjacent to each other with the second polarity period P11b interposed therebetween are different from each other in the first AC period PH11, and thus a heat load applied to the first electrode 92 varies for each of the first unit driving periods U11. Consequently, the extent to which the first electrode 92 is melted varies, and thus growth of the protrusion 552p is stabilized. In the present embodiment, the lengths of the second polarity periods P21b which are adjacent to each other with the first polarity period P21a interposed therebetween are different from each other in the second AC period PH21, and thus the protrusion 562p of the second electrode 93 can also be stabilized.

A decrease in the temperature of the second electrode 93 serving as a cathode in the first polarity period P11a is minimized to some extent since the second polarity period P11b is provided, but the temperature of the second electrode 93 may gradually decrease over time in the first AC period PH11.

In relation to this problem, according to the example shown in Table 1, in the first AC period PH11, the lengths t11a of the plurality of first polarity periods P11a are set to decrease as the first polarity periods P11a are provided temporally later. For this reason, in the first AC period PH11, an interval for switching to the second polarity period P11b is shortened as time elapses, and thus it is possible to further minimize a decrease in the temperature of the second electrode 93. In the present embodiment, in the second AC period PH21, the lengths t21b of the plurality of second polarity periods P21b are set to decrease as the second polarity periods P21b are provided temporally later. Therefore, it is possible to further minimize a decrease in the temperature of the first electrode 92 in the second AC period PH21.

In the present embodiment, the following configurations and methods may be employed.

In the present embodiment, each of the number of the first unit driving periods U11 included in the first AC period PH11 and the number of the second unit driving periods U21 included in the second AC period PH21 may be five or less, and may be seven or more.

In the present embodiment, the number of the first unit driving periods U11 included in the first AC period PH11 may be different from the number of the second unit driving periods U21 included in the second AC period PH21.

In the present embodiment, lengths of the unit driving periods may be different from each other in only one of the first AC period PH11 and the second AC period PH21.

In the present embodiment, the lengths t11a of the first polarity periods P11a which are adjacent to each other with the second polarity period P11b interposed therebetween may be different from each other only in the first AC period PH11 among the first AC period PH11 and the second AC period PH21, and the lengths t21b of the second polarity periods P21b which are adjacent to each other with the first polarity period P21a interposed therebetween may be different from each other only in the second AC period PH21.

In the present embodiment, the lengths t11a of the plurality of first polarity periods P11a may be set to become smaller as the first polarity periods P11a are provided temporally later only in the first AC period PH11 among the first AC period PH11 and the second AC period PH21, and the lengths t21b of the plurality of second polarity periods P21b may be set to become smaller as the second polarity periods P21b are provided temporally later only in the second AC period PH21.

In the present embodiment, the plurality of first unit driving periods U11 included in the first AC period PH11 may be the same as each other, and may change at random.

In the present embodiment, the lengths of the first polarity periods P11a included in the first unit driving periods U11 may be the same as each other, and may change at random.

In the present embodiment, the predetermined value X may be equal to or greater than 1 and be smaller than 3.0.

In the present embodiment, the length t11 of the first AC period PH11 may be less than 5.0 milliseconds (ms).

In the present embodiment, the length t11a of the first polarity period P11a may be less than 1.0 millisecond (ms).

In the present embodiment, the length t11b of the second polarity period P11b may be less than 0.16 milliseconds (ms), and may be equal to or more than 1.0 millisecond (ms).

In the present embodiment, the length of each period in the driving current waveform DW1 may be changed according to a change in the driving power Wd or the lamp voltage Vla. Hereinafter, a detailed description thereof will be made.

Table 2 shows an example of a case of changing the length t11 of the first AC period PH11 according to a change in the driving power Wd.

TABLE 2

| Driving power Wd (W) | Length t11 (ms) of first AC period | Average length (ms) of first polarity periods | Average length (ms) of second polarity periods |
| --- | --- | --- | --- |
| 200 | 6.5 | 3.33 | 0.63 |
| 160 | 9.5 | 2.22 | 0.5 |
| 140 | 12.5 | 1.67 | 0.4 |
| 120 | 15.5 | 1.25 | 0.34 |

As shown in Table 2, in this configuration, the length t11 of the first AC period PH11 is set to become larger as the driving power Wd supplied to the discharge lamp 90 is reduced.

If the driving power Wd supplied to the discharge lamp 90 is reduced, the driving current I supplied to the discharge lamp 90 is also reduced. Therefore, a heat load applied to the first electrode 92 and the second electrode 93 is reduced, and thus the protrusions 552p and 562p of the first electrode 92 and the second electrode 93 are unlikely to be melted. For this reason, the protrusions 552p and 562p may be deformed, and thus flickering may occur.

In contrast, according to this configuration, the length t11 of the first AC period PH11 is set to become larger as the driving power Wd supplied to the discharge lamp 90 is reduced. Thus, a total time of the first polarity periods P11a, that is, time for heating the first electrode 92 can be increased, and thus it is possible to improve a melting amount of the protrusion 552p of the first electrode 92. Consequently, according to the configuration, in a case where the driving power Wd is low, a shape of the protrusion 552p of the first electrode 92 can be easily maintained, and the occurrence of flickering can be minimized. Such a configuration, and operations and effects are also the same for the second AC period PH21 except that a polarity is inverted. In other words, in the present embodiment, the length t11 of the first AC period PH11 and the length t21 of the second AC period PH21 are set to become larger as the driving power Wd is reduced. Consequently, the occurrence of flickering can be minimized in both of the first AC period PH11 and the second AC period. PH21.

As shown in Table 2, in this configuration, each of an average length of the first polarity periods P11a and an average length of the second polarity periods P11b is set to become smaller as the driving power Wd is reduced.

If the length t11 of the first AC period PH11 is set to be large as described above when the driving power Wd is reduced, the time for heating the first electrode 92 is increased, but time for the temperature of the second electrode 93 to decrease is lengthened. For this reason, the protrusion 562p of the second electrode 93 may be deformed, and thus flickering may occur.

In contrast, according to this configuration, the average length of the first polarity periods P11a is set to become smaller as the driving power Wd supplied to the discharge lamp 90 is reduced. Thus, an interval to switch from the first polarity to the second polarity can be shortened, and thus a frequency of heating the second electrode 93 can be increased. Therefore, according to the configuration, it is possible to prevent the second electrode 93 from being deformed due to a decrease in the temperature of the second electrode 93 in a case where the length t11 of the first AC period PH11 is set to become larger as the driving power Wd is reduced. Such a configuration, and operations and effects are also the same for the second AC period PH21 except that a polarity is inverted. In other words, in the present embodiment, each of the average length of the first polarity periods P11a in the first AC period PH11 and the average length of the second polarity periods P21b in the second AC period PH21 is set to become smaller as the driving power Wd is reduced. Consequently, it is also possible to prevent the first electrode 92 from being deformed due to a decrease in the temperature of the first electrode 92 in the second AC period PH21.

Table 3 shows an example of a case of changing the length t11 of the first AC period PH11 according to a change in the lamp voltage Vla.

TABLE 3

| Lamp voltage Vla (V) | Length t11 (ms) of first AC period | Average length (ms) of first polarity period | Average length (ms) of second polarity period |
| --- | --- | --- | --- |
| 60 | 9.5 | 2.22 | 0.5 |
| 80 | 12.5 | 1.67 | 0.4 |
| 100 | 13.5 | 1.43 | 0.38 |
| 120 | 14 | 1.25 | 0.36 |

As shown in Table 3, in this configuration, the length t11 of the first AC period PH11 is set to become larger as the lamp voltage Vla applied between the first electrode 92 and the second electrode 93 of the discharge lamp 90 is increased.

If the discharge lamp 90 deteriorates over time, a distance between the first electrode 92 and the second electrode 93 increases, and thus the lamp voltage Via also increases. In constant power driving, if the lamp voltage Via increases, the driving current I decreases, and thus a heat load applied to the first electrode 92 and the second electrode 93 is reduced. Therefore, the protrusions 552p and 562p of the first electrode 92 and the second electrode 93 are unlikely to be melted. For this reason, the protrusions 552p and 562p of the first electrode 92 and the second electrode 93 may not be sufficiently melted, and thus thicknesses of the protrusions 552p and 562p may not be maintained.

In contrast, according to this configuration, the length t11 of the first AC period PH11 is set to become larger as the lamp voltage Vla applied to the discharge lamp 90 increases. Therefore, as the first electrode 92 becomes unlikely to be melted, the time for heating the first electrode 92 can be increased, and thus it is possible to prevent the first electrode 92 from being unmelted. Such a configuration, and operations and effects are also the same for the second AC period PH21 except that a polarity is inverted. In other words, in the present embodiment, each of the length t11 of the first AC period PH11 and the length t21 of the second AC period PH21 is set to become larger as the lamp voltage Vla increases. Consequently, it is also possible to prevent the second electrode 93 from being unmelted in the second AC period PH21.

In this configuration, in the first AC period PH11, each of an average length of the first polarity periods P11a and an average length of the second polarity periods P11b is set to become smaller as the lamp voltage Vla increases.

As described above, if the length t11 of the first AC period PH11 is set to be large, time for the temperature of the second electrode 93 to decrease is lengthened. For this reason, the protrusion 562p of the second electrode 93 may be deformed, and thus flickering may occur.

In contrast, according to this configuration, the average length of the first polarity periods P11a in the first AC period PH11 is set to become smaller as the lamp voltage Vla applied to the discharge lamp 90 increases. Therefore, as described above, it is possible to prevent the second electrode 93 from being deformed due to a decrease in the temperature of the second electrode 93 in a case where the length t11 of the first AC period PH11 is set to become larger as the lamp voltage Via increases. Such a configuration, and operations and effects are also the same for the second AC period PH21 except that a polarity is inverted. In other words, in the present embodiment, each of the average length of the first polarity periods P11a in the first AC period PH11 and the average length of the second polarity periods P21b in the second AC period PH21 is set to become smaller as the lamp voltage Vla increases. Consequently, it is also possible to prevent the first electrode 92 from being deformed due to a decrease in the temperature of the first electrode 92 in the second AC period PH21.

Second Embodiment

A second embodiment is different from the first embodiment in terms of a length of the first AC period and a length of the second AC period.

In the following description, the same constituent elements as in the above-described embodiment are given the same reference numerals, and description thereof will be omitted in some cases.

Figure 8:
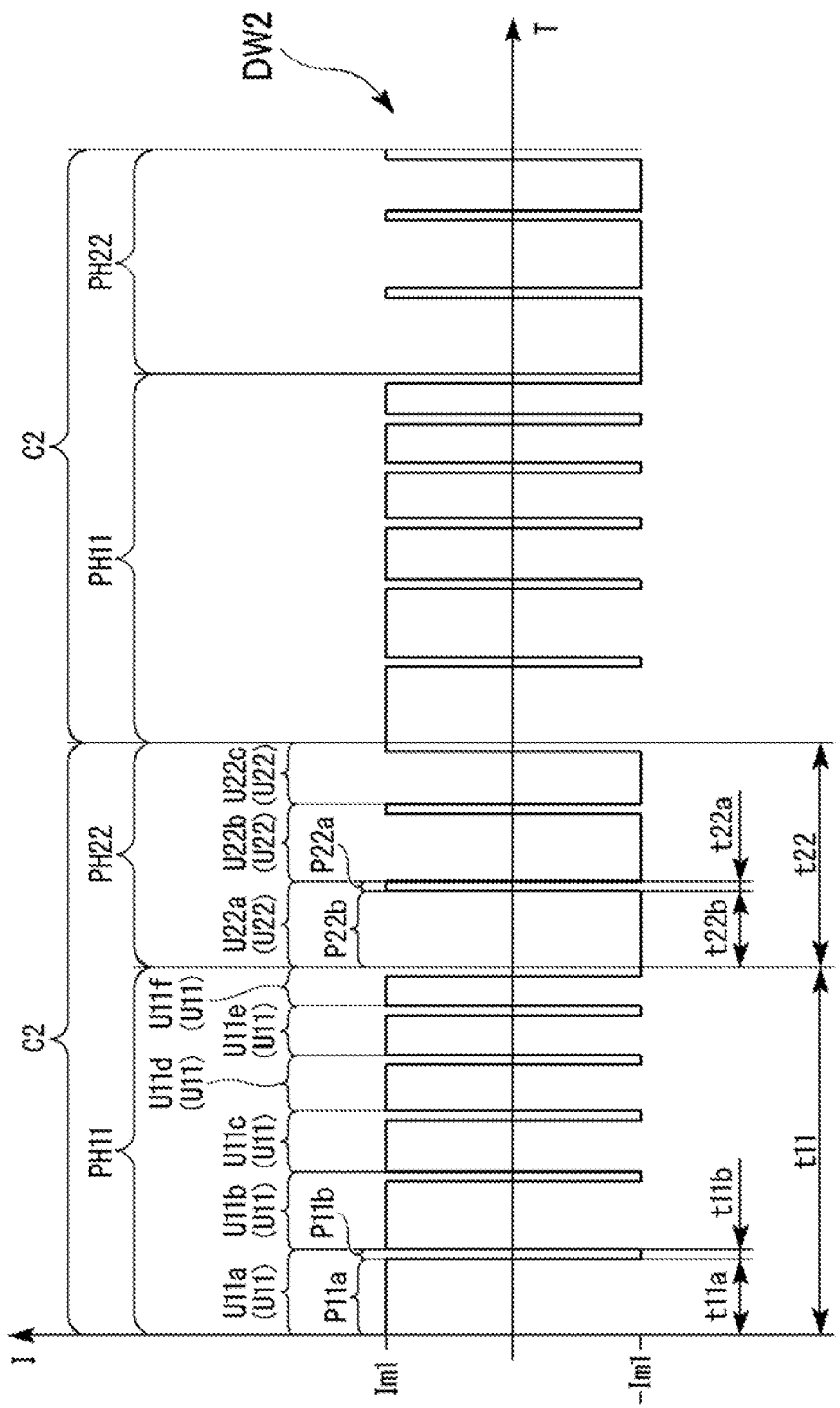
FIG. 8 is a diagram illustrating a driving current waveform according to a second embodiment.

FIG. 8 is a diagram illustrating a driving current waveform DW2 of the driving current I supplied to the discharge lamp 90 of the present embodiment. In FIG. 8, a longitudinal axis expresses the driving current I, and a transverse axis expresses time T.

In the present embodiment, the controller 40 controls the discharge lamp driving unit 230 according to the driving current waveform DW2 illustrated in FIG. 8.

As illustrated in FIG. 8, the driving current waveform DW2 is formed of a plurality of consecutive control cycles C2. The control cycle C2 includes a first AC period PH11 and a second AC period PH22. In other words, the driving current waveform DW2 (driving current I) includes the first AC period PH11 and the second AC period PH22. The second AC period PH22 is a period in which an AC current whose polarity is inverted between a current value Im1 and a current value −Im1 is supplied to the discharge lamp 90 as the driving current I.

The second AC period PH22 is a period in which the second electrode 93 is heated. The second AC period PH22 includes a plurality of consecutive second unit driving periods U22 each of which is formed of a first polarity period P22a in which the first electrode 92 serves as an anode and a second polarity period P22b in which the second electrode 93 serves as an anode. In the present embodiment, the second AC period PH22 is formed of, for example, three second unit driving periods U22, that is, a second unit driving period U22a, a second unit driving period U22b, and a second unit driving period U22c which are continuously provided in this order.

In the present embodiment, the second unit driving periods U22a to U22c of the second AC period PH22 are the same as the second unit driving periods U21a to U21c of the second AC period PH21 in the first embodiment.

In the present embodiment, the length t11 of the first AC period PH11 is different from a length t22 of the second AC period PH22. More specifically, the length t22 of the second AC period PH22 is smaller than the length t11 of the first AC period PH11.

According to the present embodiment, since the length t11 of the first AC period PH11 is larger than the length t22 of the second AC period PH22, the first electrode 92 is heated more than the second electrode 93 in the control cycle C2. For this reason, if the control cycle C2 is repeated, the entire first electrode 92 is brought into a high temperature state, and thus the protrusion 552p is more easily melted. A total time of the repeated control cycles C2 is set to 0.25 seconds (s), and thus the first electrode 92 can be effectively heated.

After the control cycle C2 is repeated to some extent, the control cycle C2 in which a polarity is inverted is repeated multiple times, and thus the protrusions 552p and 562p of both of the first electrode 92 and the second electrode 93 can be melted so that growth of the protrusions 552p and 562p can be promoted.

In the above description, the second AC period PH22 which is shorter than the first AC period PH11 is formed of the second unit driving periods U22a to U22c which are the same as the second unit driving periods U21a to U21c in the second AC period PH21 of the first embodiment, but the invention is not limited thereto.

In the present embodiment, as a second AC period shorter than the first AC period PH11, a period formed of various second unit driving periods may be selected in the same manner as in the first embodiment.

Third Embodiment

A third embodiment is different from the first embodiment in that a third AC period is provided immediately after the first AC period and the second AC period.

In the following description, the same constituent elements as in the above-described embodiments are given the same reference numerals, and description thereof will be omitted in some cases.

Figure 9:
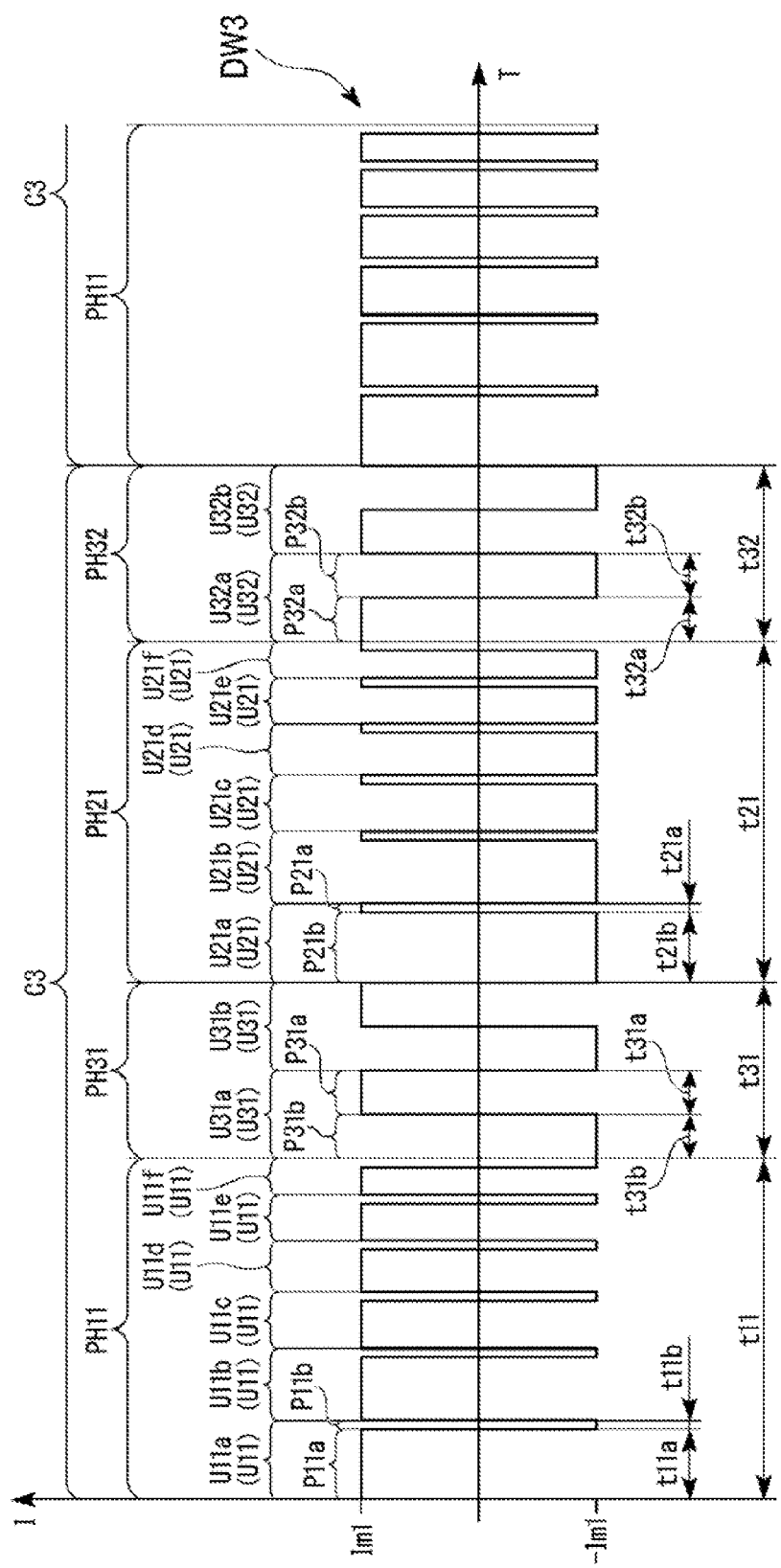
FIG. 9 is a diagram illustrating a driving current waveform according to a third embodiment.

FIG. 9 is a diagram illustrating a driving current waveform DW3 of the driving current I supplied to the discharge lamp 90 of the present embodiment. In FIG. 9, a longitudinal axis expresses the driving current I, and a transverse axis expresses time T.

In the present embodiment, the controller 40 controls the discharge lamp driving unit 230 according to the driving current waveform DW3 illustrated in FIG. 9.

As illustrated in FIG. 9, the driving current waveform DW3 is formed of a plurality of consecutive control cycles C3. The control cycle C3 includes a first AC period PH11, a third AC period PH31, a second AC period PH21, and a third AC period PH32 in this order. In other words, the driving current waveform DW3 (driving current I) includes the first AC period PH11, the third AC period PH31, the second AC period PH21, and the third AC period PH32. The third AC period PH31 and the third AC period PH32 are periods in which an AC current whose polarity is inverted between a current value Im1 and a current value −Im1 is supplied to the discharge lamp 90 as the driving current I.

The third AC period PH31 is provided immediately after the first AC period PH11. The third AC period PH31 includes a plurality of consecutive third unit driving periods U31 each of which is formed of a first polarity period P31a in which the first electrode 92 serves as an anode and a second polarity period P31b in which the second electrode 93 serves as an anode. In the present embodiment, the third AC period PH31 is formed of, for example, two third unit driving periods U31, that is, a third unit driving period U31a and a third unit driving period U31b which are continuously provided in this order.

The third AC period PH32 is provided immediately after the second AC period PH21. The third AC period PH32 includes a plurality of consecutive third unit driving periods U32 each of which is formed of a first polarity period P32a in which the first electrode 92 serves as an anode and a second polarity period P32b in which the second electrode 93 serves as an anode. In the present embodiment, the third AC period PH32 is formed of, for example, two third unit driving periods U32, that is, a third unit driving period U32a and a third unit driving period U32b which are continuously provided in this order.

In the present specification, the third AC period being provided immediately after the first AC period or the second AC period includes a case where the third AC period is provided following the first AC period or the second AC period with no other period interposed therebetween after the first AC period or the second AC period ends.

In the third unit driving period U31, a length t31a of the first polarity period P31a and a length t31b of the second polarity period P31b are the same as each other.

In the third unit driving period U32, a length t32a of the first polarity period P32a and a length t32b of the second polarity period P32b are the same as each other.

In the driving current waveform DW3 of the present embodiment, the third AC period PH31 and the third AC period PH32 have the same waveform in that a polarity is inverted.

Therefore, the length t31 of the third AC period PH31 is the same as the length t32 of the third AC period PH32. In the present embodiment, the length t31 of the third AC period PH31 and the length t32 of the third AC period PH32 are smaller than the length t11 of the first AC period PH11 and the length t21 of the second AC period PH21.

A frequency of the driving current I in the third AC periods PH31 and PH32 is set according to a purpose. For example, in a case where an electrode heated in the third AC periods PH31 and PH32 is further heated to a higher temperature, a frequency of the driving current I in the third AC periods PH31 and PH32 is set to a relatively low frequency such as a frequency which is higher than about 10 Hz and is equal to or lower than about 300 Hz. Through the setting in the above-described way, an electrode heated in the third AC periods PH31 and PH32 can be further heated, and thus the temperature of the electrode can be made high.

For example, in a case where growth of a protrusion of an electrode which is heated and melted in the third AC periods PH31 and PH32 is promoted, a frequency of the driving current I in the third AC periods PH31 and PH32 is set to a relatively high frequency such as a frequency which is equal to or higher than 600 Hz and is equal to or lower than about 1000 Hz. Through the setting in the above-described way, the protrusion of the electrode which is heated and melted in the third AC periods PH31 and PH32 is coagulated and is thus promoted to grow.

For example, a frequency of the driving current I in the third AC periods PH31 and PH32 may be set to a frequency used to drive the discharge lamp 90 for the purpose of controlling a shape of the protrusion of the electrode.

As mentioned above, according to the present embodiment, since the third AC period PH31 and the third AC period PH32 are respectively provided immediately after the first AC period PH11 and immediately after the second AC period PH21, a frequency of the driving current I in the third AC periods PH31 and PH32 is adjusted as described above, and thus it is possible to control shapes or the extent of growth of the protrusions 552p and 562p of the first electrode 92 and the second electrode 93.

For example, in a case of selecting a method of promoting growth of the protrusion by supplying a DC current to the discharge lamp 90 and repeatedly performing melting and coagulation of the electrode by using a combination of the DC current and an AC current having a relatively high frequency, there is a problem in that the temperature of an electrode serving as a cathode decreases when the DC current is supplied. In addition, since a length of a period in which the DC current is supplied is restricted by the polarity inversion circuit 30 of the discharge lamp lighting device 10, there is a problem in that it is hard to lengthen a time period for driving the discharge lamp 90 longer than a predetermined time period by using biasing of a polarity.

In contrast, according to the present embodiment, since the first AC period. PH11 and the second AC period PH21 are used instead of a DC current, as described in the first embodiment and the second embodiment, the temperature of the other electrode with respect to one electrode which is heated can be prevented from decreasing in the first AC period PH11 and the second AC period PH21.

Since the driving current waveform DW3 is formed of a combination of AC periods, the combination is unlikely to be restricted by the polarity inversion circuit 30, and it is easy to lengthen a time period for driving the discharge lamp 90 by using biasing of a polarity.

In the present embodiment, the following configurations may be employed.

In the above description, the third AC period PH31 is provided immediately after the first AC period PH11, and the third AC period PH32 is provided immediately after the second AC period PH21, but the invention is not limited thereto. In the present embodiment, the third AC period may be provided immediately after only one of the first AC period PH11 and the second AC period PH21. In other words, the third AC period may be provided immediately after at least one of the first AC period PH11 and the second AC period PH21.

In the present embodiment, the lengths t31 and t32 of the third AC periods PH31 and PH32 may be larger than the length t11 of the first AC period PH11 and the length t21 of the second AC period PH21.

Fourth Embodiment

A fourth embodiment is different from the first embodiment in that a waveform period including the first AC period and the second AC period is provided.

Figure 10:
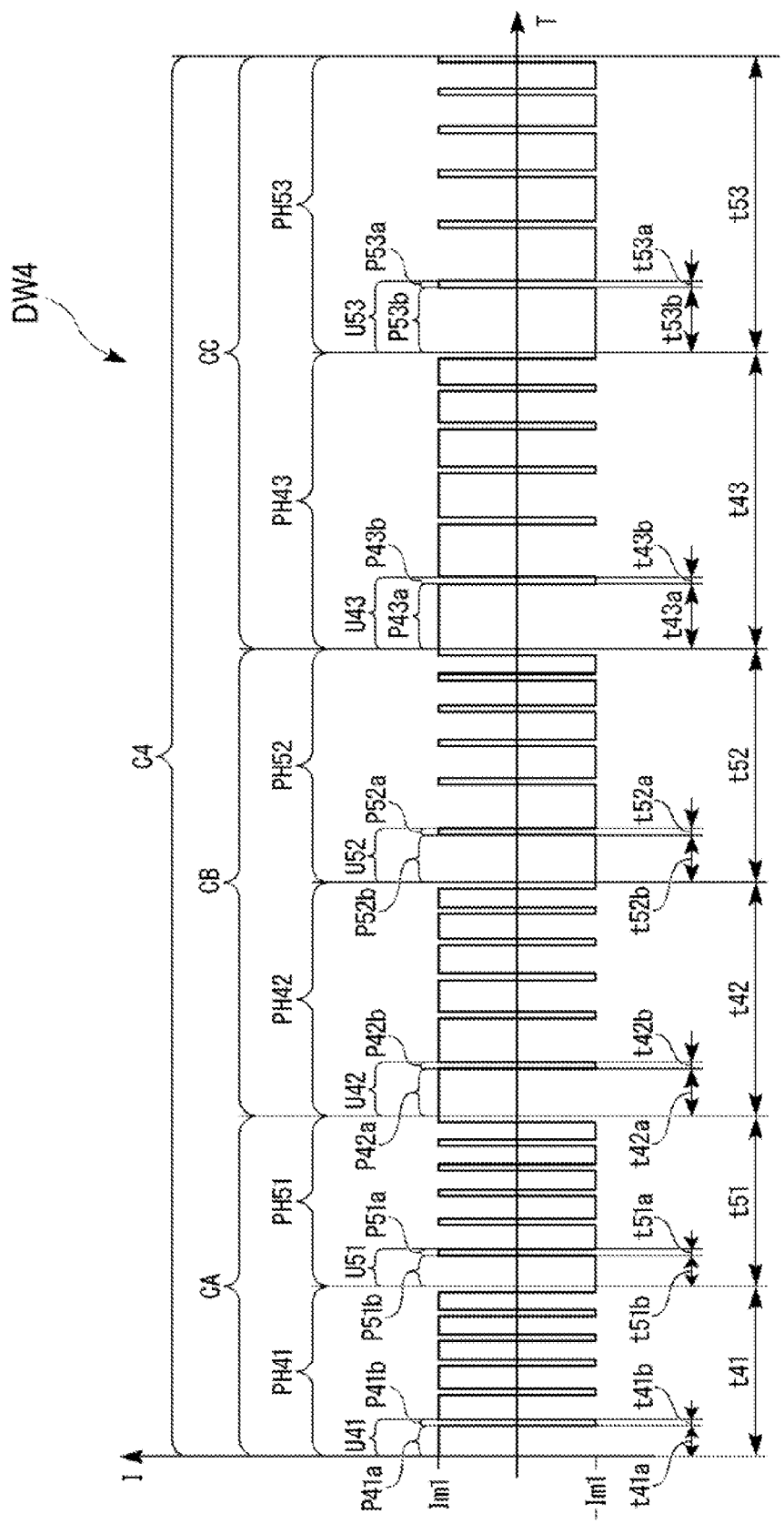
FIG. 10 is a diagram illustrating a driving current waveform according to a fourth embodiment.

FIG. 10 is a diagram illustrating a driving current waveform DW4 of the driving current I supplied to the discharge lamp 90 of the present embodiment. In FIG. 10, a longitudinal axis expresses the driving current I, and a transverse axis expresses time T.

In the present embodiment, the controller 40 controls the discharge lamp driving unit 230 according to the driving current waveform DW4 illustrated in FIG. 10.

Driving Current Waveform

As illustrated in FIG. 10, the driving current waveform DW4 is formed of a plurality of consecutive control cycles C4. The control cycle C4 includes a first waveform period CA, a second waveform period CB, and a third waveform period CC in this order. In other words, the driving current waveform DW4 (driving current I) includes the first waveform period CA, the second waveform period CB, and the third waveform period CC in a plurality.

First Waveform Period

The first waveform period CA of the present embodiment includes a first AC period PH41 and a second AC period PH51. The first AC period PH41 includes a plurality of consecutive first unit driving periods U41 each of which is formed of a first polarity period P41a and a second polarity period P41b. The second AC period PH51 includes a plurality of consecutive second unit driving periods U51 each of which is formed of a first polarity period P51a and a second polarity period P51b.

In the first waveform period CA of the present embodiment, for example, a waveform of the first AC period PH41 is set to be the same as a waveform of the second AC period PH51 except that a polarity is inverted. In other words, a length t41a of the first polarity period P41a in each of the first unit driving periods U41 is the same as a length t51b of the second polarity period P51b in each of the second unit driving periods U51. A length t41b of the second polarity period P41b in each of the first unit driving periods U41 is the same as a length t51a of the first polarity period P51a in the second unit driving periods U51.

For this reason, in the present embodiment, a length t41 of the first AC period PH41 is the same as a length t51 of the second AC period PH51. Other configurations of the first AC period PH41 are the same as the configurations of the first AC period PH11 of the first embodiment. Other configurations of the second AC period PH51 are the same as the configurations of the second AC period PH21 of the first embodiment.

Also in the second waveform period CB and the third waveform period CC, a first AC period and a second AC period have the same waveform except that a polarity is inverted. For this reason, in the following description, only the first AC period will be described as a representative in some cases.

Second Waveform Period

The second waveform period CB of the present embodiment includes a first AC period PH42 and a second AC period PH52. The first AC period PH42 and the second AC period PH52 are periods in which an AC current whose polarity is inverted between a current value Im1 and a current value −Im1 is supplied to the discharge lamp 90 as the driving current I.

The first AC period PH42 includes a plurality of consecutive first unit driving periods U42 each of which is formed of a first polarity period P42a and a second polarity period P42b.

The second AC period PH52 includes a plurality of consecutive second unit driving periods U52 each of which is formed of a first polarity period P52a and a second polarity period P52b.

In the second waveform period CB of the present embodiment, in the same manner as in the first waveform period CA, for example, a waveform of the first AC period PH42 is set to be the same as a waveform of the second AC period PH52 except that a polarity is inverted. In other words, a length t42a of the first polarity period P42a in each of the first unit driving periods U42 is the same as a length t52b of the second polarity period P52b in each of the second unit driving periods U52. A length t42b of the second polarity period P42b in each of the first unit driving periods U42 is the same as a length t52a of the first polarity period P52a in the second unit driving periods U52. For this reason, a length t42 of the first AC period PH42 is the same as a length t52 of the second AC period PH52.

The length t42 of the first AC period PH42 of the second waveform period CB is larger than the length t41 of the first AC period PH41 of the first waveform period CA. The length t52 of the second AC period PH52 of the second waveform period CB is larger than the length t51 of the second AC period PH51 of the first waveform period CA.

In the present embodiment, the length t42 of the first AC period PH42 is preferably set to be equal to or more than, for example, 20 milliseconds (ms), and is more preferably set to be equal to or more than 200 milliseconds (ms). Through the setting in the above-described way, a heat load applied to the first electrode 92 in the second waveform period CB can be made appropriately larger than in the first waveform period CA. Consequently, since a variation width of a heat load applied to the first electrode 92 can be increased in the first waveform period CA and the second waveform period CB, the protrusion 552p of the first electrode 92 can be caused to stably grow.

The first AC period PH42 and the second AC period PH52 included in the second waveform period CB are different from the first AC period PH41 and the second AC period PH51 included in the first waveform period CA in terms of a range of a ratio between lengths of the first polarity period and the second polarity period of the unit driving period constituting each period.

In the present embodiment, a range of a ratio (duration ratio) of the length t42a of the first polarity period P42a to the length t42b of the second polarity period P42b in the first unit driving periods U42 of the second waveform period CB is wider than a range of a ratio (duration ratio) of the length t41a of the first polarity period P41a to the length t41b of the second polarity period P41b in the first unit driving periods U41 of the first waveform period CA.

In the present embodiment, for example, the maximum value of the duration ratio of the second waveform period CB is greater than the maximum value of the duration ratio of the first waveform period CA. This is also the same for the second AC period PH52. In other words, the maximum value of a ratio of a length of a longer polarity period to a length of a shorter polarity period in the AC period of the second waveform period CB is greater than the maximum value of a ratio of a length of a longer polarity period to a length of a shorter polarity period in the AC period of the first waveform period CA.

In the present embodiment, for example, the minimum value of the duration ratio of the second waveform period CB is greater than the minimum value of the duration ratio of the first waveform period CA. This is also the same for the second AC period PH52. In other words, the minimum value of a ratio of a length of a longer polarity period to a length of a shorter polarity period in the AC period of the second waveform period CB is greater than the minimum value of a ratio of a length of a longer polarity period to a length of a shorter polarity period in the AC period of the first waveform period CA.

In the present embodiment, for example, the duration ratio of the second waveform period CB is more than 1.0 in the same manner as in the first waveform period CA. In the present embodiment, the duration ratio of the second waveform period CB is set to be equal to or more than 3.0, and is preferably set to be equal to or more than 6.0.

Through the setting in the above-described way, a variation width of a heat load applied to the first electrode 92 can be increased, and thus the protrusion 552p of the first electrode 92 can be caused to stably grow.

In the present embodiment, the lengths of the respective first unit driving periods U42 are different from each other. Consequently, in the present embodiment, the lengths of the first unit driving periods U42 which are temporally adjacent to each other are different from each other.

In the present embodiment, the length t42a of the first polarity period P42a of the second waveform period CB is equal to or more than, for example, 1.0 millisecond (ms), and is preferably equal to or more than 2.5 milliseconds (ms). In other words, the length t42a of the first polarity period P42a of the second waveform period CB is equal to or more than a length of a half cycle of 500 Hz, and is preferably equal to or more than a length of a half cycle of 200 Hz.

Through the setting in the above-described way, since a variation width of a heat load applied to the first electrode 92 can be increased, the protrusion 552p of the first electrode 92 can be caused to stably grow.

A sum of the first polarity periods P42a in the first AC period PH42 of the second waveform period CB is larger than a sum of the first polarity periods P41a in the first AC period PH41 of the first waveform period CA. A sum of the second polarity periods P52b in the second AC period PH52 of the second waveform period CB is larger than a sum of the second polarity periods P51b in the second AC period PH51 of the first waveform period CA.

In other words, a larger sum of lengths of a sum of lengths of the first polarity periods and a sum of lengths of the second polarity periods in the AC periods of the second waveform period CB is larger than a larger sum of lengths of the first polarity periods and a sum of lengths of the second polarity periods in the AC periods of the first waveform period CA.

Third Waveform Period

The third waveform period CC includes a first AC period PH43 and a second AC period PH53. The first AC period PH43 and the second AC period PH53 are periods in which an AC current whose polarity is inverted between a current value Im1 and a current value −Im1 is supplied to the discharge lamp 90 as the driving current I.

The first AC period PH43 includes a plurality of consecutive first unit driving periods U43 each of which is formed of a first polarity period P43a and a second polarity period P43b.

The second AC period PH53 includes a plurality of consecutive second unit driving periods U53 each of which is formed of a first polarity period P53a and a second polarity period P53b.

In the third waveform period CC of the present embodiment, in the same manner as in the first waveform period CA, for example, a waveform of the first AC period PH43 is set to be the same as a waveform of the second AC period PH53 except that a polarity is inverted. In other words, a length t43a of the first polarity period P43a in each of the first unit driving periods U43 is the same as a length t53b of the second polarity period P53b in each of the second unit driving periods U53. A length t43b of the second polarity period P43b in each of the first unit driving periods U43 is the same as a length t53a of the first polarity period P53a in the second unit driving periods U53. For this reason, a length t43 of the first AC period PH43 is the same as a length t53 of the second AC period PH53.

The length t43 of the first AC period PH43 of the third waveform period CC is larger than the length t41 of the first AC period PH41 of the first waveform period CA, and is also larger than the length t42 of the first AC period PH42 of the second waveform period CB. The length t53 of the second AC period PH53 of the third waveform period CC is larger than the length t51 of the second AC period PH51 of the first waveform period CA, and is also larger than the length t52 of the second AC period PH52 of the second waveform period CB.

In the present embodiment, the length t43 of the first AC period PH43 is preferably set to be equal to or more than, for example, 20 milliseconds (ms), and is more preferably set to be equal to or more than 200 milliseconds (ms). Through the setting in the above-described way, a heat load applied to the first electrode 92 in the third waveform period CC can be made appropriately larger than in the first waveform period CA. Consequently, since a variation width of a heat load applied to the first electrode 92 can be increased in the first waveform period CA and the third waveform period CC, the protrusion 552p of the first electrode 92 can be caused to stably grow.

The first AC period PH42 and the second AC period PH52 included in the third waveform period CC are different from the first AC period PH41 and the second AC period PH51 included in the first waveform period CA, and the first AC period PH42 and the second AC period PH52 included in the second waveform period CB, in terms of a range of a ratio between lengths of the first polarity period and the second polarity period of the unit driving period constituting each period.

In the present embodiment, a range of a ratio (duration ratio) of the length t43a of the first polarity period P43a to the length t43b of the second polarity period P43b in the first unit driving periods U43 of the third waveform period CC is wider than a range of a ratio of the length t41a of the first polarity period P41a to the length t41b of the second polarity period P41b in the first unit driving periods U41 of the first waveform period CA. The range of the duration ratio of the third waveform period CC is wider than a range of a duration ratio of the second waveform period CB.

In the present embodiment, for example, the maximum value of the duration ratio of the third waveform period CC is greater than the maximum value of the duration ratio of the first waveform period CA, and is also greater than the maximum value of the duration ratio of the second waveform period CB.

In the present embodiment, for example, the minimum value of the duration ratio of the third waveform period CC is greater than the minimum value of the duration ratio of the first waveform period CA, and is also greater than the minimum value of the duration ratio of the second waveform period CB.

In the present embodiment, for example, the duration ratio of the third waveform period CC is more than 1.0 in the same manner as in the first waveform period CA. In the present embodiment, the duration ratio of the third waveform period CC is set to be equal to or more than 3.0, preferably set to be equal to or more than 6.0, and more preferably set to be equal to or more than 10.0.

Through the setting in the above-described way, a variation width of a heat load applied to the first electrode 92 can be increased, and thus the protrusion 552p of the first electrode 92 can be caused to stably grow.

In the present embodiment, the lengths of the respective first unit driving periods U43 are different from each other. Consequently, in the present embodiment, the lengths of the first unit driving periods U43 which are temporally adjacent to each other are different from each other.

In the present embodiment, the length t43a of the first polarity period P43a of the third waveform period CC is equal to or more than, for example, 1.0 millisecond (ms), and is preferably equal to or more than 2.5 milliseconds (ms). Through the setting in the above-described way, a variation width of a heat load applied to the first electrode 92 can be increased, and thus the protrusion 552p of the first electrode 92 can be caused to stably grow.

A sum of the first polarity periods P43a in the first AC period PH43 of the third waveform period CC is larger than a sum of the first polarity periods P42a in the first AC period PH42 of the second waveform period CB. A sum of the second polarity periods P53b in the second AC period PH53 of the third waveform period CC is larger than a sum of the second polarity periods P52b in the second AC period PH52 of the second waveform period CB.

In other words, a larger sum of lengths of a sum of lengths of the first polarity periods and a sum of lengths of the second polarity periods in the AC periods of the third waveform period CC is larger than a larger sum of lengths of the first polarity periods and a sum of lengths of the second polarity periods in the AC periods of the second waveform period CB.

In the present embodiment, a waveform of the driving current in the first AC period PH41 and the second AC period PH51 of the first waveform period CA is referred to as a waveform A. In the present embodiment, a waveform of the driving current in the first AC period PH42 and the second AC period PH52 of the second waveform period CB is referred to as a waveform B. In the present embodiment, a waveform of the driving current in the first AC period PH43 and the second AC period PH53 of the third waveform period CC is referred to as a waveform C.

Examples of the respective waveforms are shown in Tables 4 to 7.

TABLE 4

Waveform A

| Length t41a (ms) of first polarity period | Length t41b (ms) of second polarity period | Duration ratio (length of first polarity period/length of second polarity period) |
| --- | --- | --- |
| 2.15 | 0.35 | 6.14 |
| 1.93 | 0.4 | 4.83 |
| 1.77 | 0.45 | 3.93 |
| 1.6 | 0.45 | 3.56 |
| 1.43 | 0.4 | 3.58 |
| 1.26 | 0.35 | 3.60 |

TABLE 5

Waveform B

| Length t42a (ms) of first polarity period | Length t42b (ms) of second polarity period | Duration ratio (length of first polarity period/length of second polarity period) |
| --- | --- | --- |
| 4.3 | 0.35 | 12.29 |
| 3.86 | 0.4 | 9.65 |
| 3.54 | 0.45 | 7.87 |
| 3.2 | 0.45 | 7.11 |
| 2.86 | 0.4 | 7.15 |
| 2.52 | 0.35 | 7.20 |

TABLE 6

Waveform C

| Length t43a (ms) of first polarity period | Length t43b (ms) of second polarity period | Duration ratio (length of first polarity period/length of second polarity period) |
| --- | --- | --- |
| 6.45 | 0.35 | 18.43 |
| 5.79 | 0.4 | 14.48 |
| 5.31 | 0.45 | 11.80 |
| 4.8 | 0.45 | 10.67 |
| 4.29 | 0.4 | 10.73 |
| 3.78 | 0.35 | 10.80 |

TABLE 7

| | Sum (ms) of lengths of first polarity periods | Length (ms) of first AC period |
| --- | --- | --- |
| Waveform A | 10.14 | 12.54 |
| Waveform B | 20.28 | 22.68 |
| Waveform C | 30.42 | 32.82 |

Each of Tables 4 to 6 shows examples of a waveform of the first AC period in each waveform period, that is, a length of the first polarity period, a length of the second polarity period, and a duration ratio in the first unit driving period included in the first AC period.

Table 7 shows a sum of lengths of the first polarity periods in each waveform of the first AC period, and a length of each first AC period in the examples shown in Tables 4 to 6.

In the examples illustrated in Table 4, the duration ratio of the first waveform period CA is set to a range, for example, from 3.56 to 6.14.

In the examples illustrated in Table 5, the duration ratio of the second waveform period CB is set to a range, for example, from 7.11 to 12.29.

In the examples illustrated in Table 6, the duration ratio of the third waveform period CC is set to a range, for example, from 10.67 to 18.43.

In the examples shown in Tables 4 to 6, ranges of lengths of the second polarity periods are set to the same range in the waveforms A, B and C.

As shown in Table 7, a sum of lengths of the first polarity periods included in each first AC period is set to be increased in order of the first waveform period CA, the second waveform period CB, and the third waveform period CC. In other words, a heat load applied to the electrode is increased in order of the waveform A, the waveform B, and the waveform C.

In the present embodiment, in a relationship between the waveform A and the waveform B, the first waveform period CA having the waveform A corresponds to a first waveform period in the appended claims, and the second waveform period CB having the waveform B corresponds to a second waveform period in the appended claims. In a relationship between the waveform A and the waveform C, the first waveform period CA having the waveform A corresponds to a first waveform period in the appended claims, and the third waveform period CC having the waveform C corresponds to a second waveform period in the appended claims. In a relationship between the waveform B and the waveform C, the second waveform period CB having the waveform B corresponds to a first waveform period in the appended claims, and the third waveform period CC having the waveform C corresponds to a second waveform period in the appended claims.

As described above, the controller 40 of the present embodiment controls the discharge lamp driving unit 230 so that the driving current I corresponding to each period is supplied to the discharge lamp 90 according to the driving current waveform DW4.

The control of the discharge lamp driving unit 230 performed by the controller 40 may be expressed as a discharge lamp driving method. In other words, a discharge lamp driving method of the present embodiment includes driving the discharge lamp 90 by supplying the driving current I to the discharge lamp 90 including the first electrode 92 and the second electrode 93, in which the driving current I includes the first waveform period CA and the second waveform period CB in which an AC current is supplied to the discharge lamp 90, in which each of the first waveform period CA and the second waveform period CB includes a first AC period and a second AC period, the first AC period including a plurality of consecutive first unit driving periods each of which is formed of a first polarity period in which the first electrode 92 serves as an anode and a second polarity period in which the second electrode 93 serves as an anode, a length of the first polarity period being larger than a length of the second polarity period, and the second AC period including a plurality of consecutive second unit driving periods each of which is formed of the first polarity period and the second polarity period, the length of the second polarity period being larger than the length of the first polarity period, and in which a sum of the lengths of the first polarity periods in the first AC period of the second waveform period CB is larger than a sum of the lengths of the first polarity periods in the first AC period of the first waveform period CA, and a sum of the lengths of the second polarity periods in the second AC period of the second waveform period CB is larger than a sum of the lengths of the second polarity periods in the second AC period of the first waveform period CA.

According to the present embodiment, the driving current waveform DW4 includes three different types of waveform periods, that is, the first waveform period CA, the second waveform period CB, and the third waveform period CC which are different from each other in terms of a sum of the lengths of the first polarity periods for heating the first electrode 92. For this reason, a heat load applied to the first electrode 92 in each waveform period varies. Consequently, the extent of the protrusion 552p of the first electrode 92 being melted varies, and thus the protrusion 552p can be caused to stably grow.

According to the present embodiment, for example, in the second waveform period CB, the duration ratio is set to be equal to or more than 6.0, and in the third waveform period CC, the duration ratio is set to be equal to or more than 10.0. For this reason, a heat load applied to the first electrode 92 in the second waveform period CB and the third waveform period CC can be made appropriately larger than in the first waveform period CA. Therefore, a melting amount of the first electrode 92 can be changed, and thus the first electrode 92 can be caused to stably grow.

According to the present embodiment, the length t42 of the first AC period PH42 in the second waveform period CB and the length t43 of the first AC period PH43 in the third waveform period CC are set to be larger than the length t41 of the first AC period PH41 in the first waveform period CA. Consequently, a heat load applied to the first electrode 92 in the second waveform period CB and the third waveform period CC can be made appropriately larger than in the first waveform period CA.

According to the present embodiment, the length t42 of the first AC period PH42 in the second waveform period CB and the length t43 of the first AC period PH43 in the third waveform period CC are set to be equal to or more than 20 milliseconds (ms), and is preferably set to be equal to or more than 200 milliseconds (ms). Consequently, a heat load applied to the first electrode 92 in the second waveform period CB and the third waveform period CC can be made more appropriately larger than in the first waveform period CA.

According to the present embodiment, the maximum value of the duration ratio in the second waveform period CB and the third waveform period CC is greater than the maximum value of the duration ratio in the first waveform period CA. According to the present embodiment, the minimum value of the duration ratio in the second waveform period CB and the third waveform period CC is greater than the minimum value of the duration ratio in the first waveform period CA. Consequently, a heat load applied to the first electrode 92 in the second waveform period CB and the third waveform period CC can be made more appropriately larger than in the first waveform period CA.

According to the present embodiment, the length of the first polarity period in the first unit driving period of the second waveform period CB and the third waveform period CC is preferably set to be equal to or more than 2.5 milliseconds (ms). Consequently, a heat load applied to the first electrode 92 in the second waveform period CB and the third waveform period CC can be made more appropriately larger than in the first waveform period CA.

In the present embodiment, the following configurations and methods may be employed.

In the above description, in the control cycle C4, the respective waveform periods are provided in order of a sum of the lengths of the first polarity periods being increased, that is, in order of the first waveform period CA, the second waveform period CB, and the third waveform period CC, but the invention is not limited thereto. In the present embodiment, the respective waveform periods may be combined with each other in any order.

Figure 11:
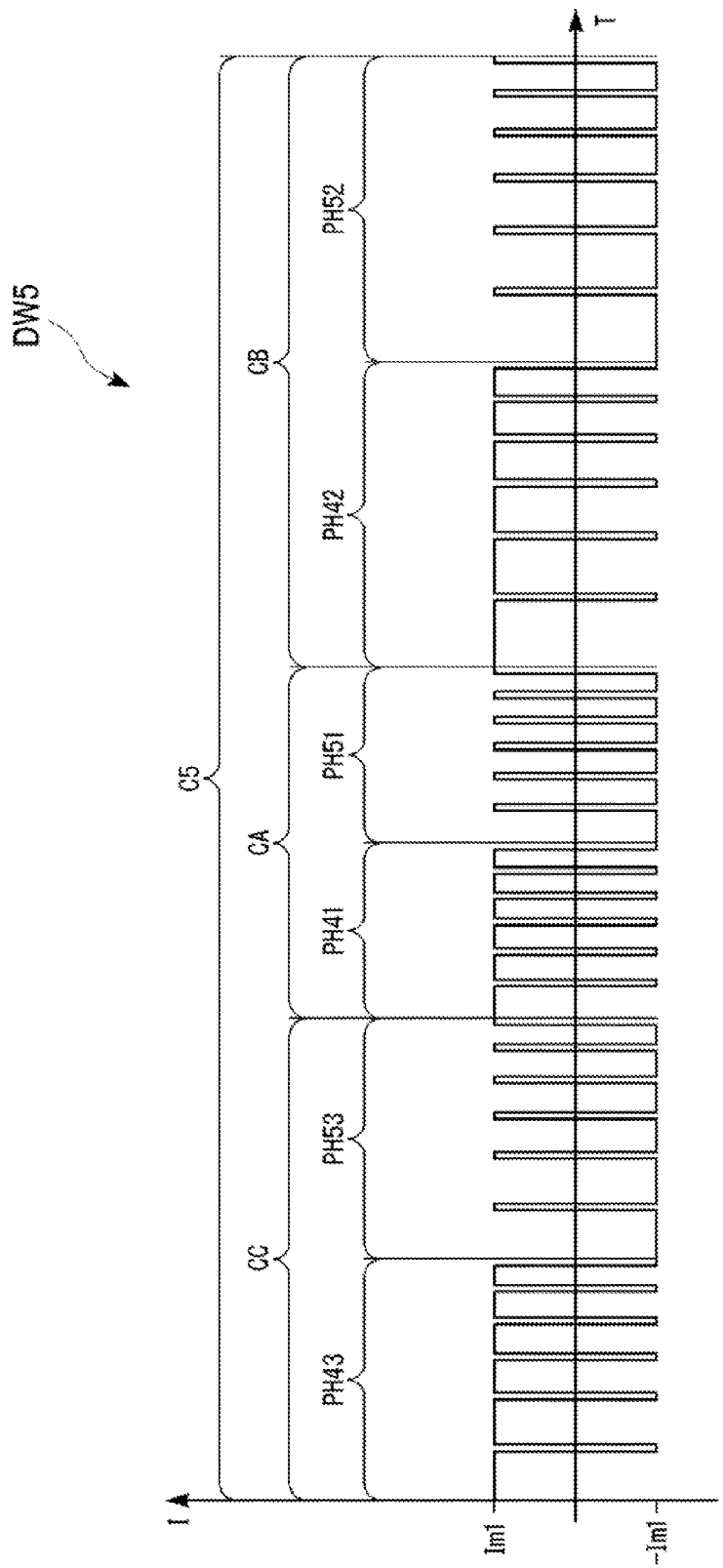
FIG. 11 is a diagram illustrating another example of a driving current waveform according to the fourth embodiment.

FIG. 11 is a diagram illustrating another example of a driving current waveform of the present embodiment. In FIG. 11, a longitudinal axis expresses the driving current I, and a transverse axis expresses time T.

As illustrated in FIG. 11, a driving current waveform DW5 is formed of a plurality of consecutive control cycles C5. The third waveform period CC, the first waveform period CA, and the second waveform period CB are provided in this order in the control cycle C5.

In the above description, the driving current waveform DW4 includes three waveform periods which respectively have different three types of waveforms A, B and C, as waveform periods, but the invention is not limited thereto. In the present embodiment, waveform periods may be of two types, and may be of four or more types. The more the types of waveform periods, the better. This is because a heat load applied to the electrode can be further changed.

A parameter such as the length of each period or the duration ratio may be arbitrarily set as long as the larger sum of the lengths among a sum of the lengths of the first polarity periods and a sum of the lengths of the second polarity periods in each AC period is increased in order of the first waveform period CA, the second waveform period CB, and the third waveform period CC.

For example, in the above description, the maximum value and the minimum value of the duration ratio of the second waveform period CB are respectively greater than the maximum value and the minimum value of the duration ratio of the first waveform period CA, but the invention is not limited thereto. In the present embodiment, one of the maximum value and the minimum value of the duration ratio of the second waveform period CB may be greater than those of the first waveform period CA. This is also the same for the second waveform period CB and the third waveform period CC.

For example, in the present embodiment, the length t42 of the first AC period PH42 in the second waveform period CB may be equal to or smaller than the length t41 of the first AC period PH41 in the first waveform period CA, and the length t43 of the first AC period PH43 in the third waveform period CC may be equal to or smaller than the length t42 of the first AC period PH42 in the second waveform period CB.

For example, a range of the duration ratio of the second waveform period CB may be equal to or smaller than a range of the duration ratio of the first waveform period CA, and a range of the duration ratio of the third waveform period CC may be equal to or smaller than a range of the duration ratio of the second waveform period CB.

For example, the length t42a of the first polarity period P42a in the second waveform period CB may be equal to or smaller than the length t41a of the first polarity period P41a in the first waveform period CA, and the length t43a of the first polarity period 943a in the third waveform period CC may be equal to or smaller than the length t42a of the first polarity period P42a in the second waveform period CB.

In the above description, each waveform period is provided alone in a single control cycle C4, but the invention is not limited thereto. In the present embodiment, for example, there may be a configuration in which, after a plurality of first waveform periods CA are provided, a plurality of second waveform periods CB are provided, and then a plurality of third waveform period CC are provided. In this case, the numbers of respective waveform periods which are provided in a plurality may be the same as or different from each other.

In the present embodiment, the duration ratio in each waveform period may be more than 1.0 and be smaller than 3.0.

In the above description, a plurality of unit driving periods in the AC period of each waveform period have different duration ratios in the example of the driving current waveform DW4 illustrated in FIG. 10, but the invention is not limited thereto. In the present embodiment, the duration ratios of the plurality of unit driving periods included in the AC period may be the same as each other.

In the above description, in the example of the driving current waveform DW4 illustrated in FIG. 10, the duration ratios of the plurality of unit driving periods in the AC period of the waveform period are decreased over time, but the invention is not limited thereto. In the present embodiment, the duration ratios of the plurality of unit driving periods included in the AC period may be increased over time, and may be changed at random.

In the above description, in the example of the driving current waveform DW4 illustrated in FIG. 10, the numbers of unit driving periods in the respective AC periods are the same as each other, but the invention is not limited thereto. In the present embodiment, the numbers of unit driving periods included in the respective AC periods may be different from each other.

In the above description, the first AC period and the second AC period have the same waveform except that a polarity is inverted in each waveform period, but the invention is not limited thereto. In the present embodiment, the first AC period and the second AC period may not have the same waveform in each waveform period.

In the present embodiment, the driving current waveform DW4 may be changed according to a change in the driving power Wd or the lamp voltage Vla. Hereinafter, a detailed description thereof will be made.

Table 8 shows an example of a case of changing a duration ratio correction coefficient α according to a change in the lamp voltage Vla.

TABLE 8

| Lamp voltage Vla (V) | Duration ratio correction coefficient α |
|---|---|
| up to 59 | 0.7 |
| 60 to 79 | 1 |
| 80 to 99 | 1.3 |
| 100 or more | 1.5 |

The duration ratio correction coefficient α is a coefficient multiplied by a duration ratio. For example, a duration ratio of each waveform is changed by multiplying the duration ratios of the above Tables 4 to 6 by the duration ratio correction coefficient α corresponding to the lamp voltage Vla, and thus a sum of the lengths of the first polarity periods in each waveform period is changed.

As shown in Table 8, in this configuration, the duration ratio correction coefficient α is set to become larger as the lamp voltage Vla applied between the first electrode 92 and the second electrode 93 of the discharge lamp 90 is increased. Consequently, it is possible to make a sum of the lengths of the first polarity periods in each waveform period larger as the lamp voltage Vla is increased. In the example shown in Table 8, the lamp voltage Vla of 60 V to 79 V is used as a reference.

According to this configuration, the duration ratio correction coefficient α is set to become larger as the lamp voltage Vla applied to the discharge lamp 90 is increased. Therefore, as the first electrode 92 becomes unlikely to be melted, the time for heating the first electrode 92 can be increased, and thus it is possible to prevent the first electrode 92 from being unmelted.

In the above-described example, the method of changing the duration ratio correction coefficient α, that is, the method of changing a duration ratio according to a change in the lamp voltage Vla has been described, but the invention is not limited thereto. In this configuration, a sum of the lengths of the first polarity periods in each waveform period may become larger as the lamp voltage Vla is increased. As a method of making a sum of the lengths of the first polarity periods in each waveform period may become larger as the lamp voltage Vla is increased, for example, a method of increasing a length of an AC period in each waveform period may be selected.

For example, a method may be selected in which a ratio of constituent of the waveform periods in which a heat load applied to the electrode is considerable is increased among waveform periods of the driving current waveform DW4. In other words, in this configuration, a ratio of the entire length of the second waveform period CB to the entire length of the first waveform period CA in the driving current waveform DW4 may become higher as the lamp voltage Vla is increased.

Table 9 shows an example of a case of changing a constituent ratio of each waveform according to a changing in the driving power Wd.

TABLE 9

| | Constituent ratio (%) | | |
|---|---|---|---|
| Driving power Wd (W) | Waveform A | Waveform B | Waveform C |
| up to 149 | 20 | 30 | 50 |
| 150 to 169 | 30 | 30 | 40 |
| 170 to 199 | 40 | 30 | 30 |
| 200 or more | 50 | 30 | 20 |

As shown in Table 9, in this configuration, as the driving power Wd supplied to the discharge lamp 90 is decreased, a constituent ratio of a waveform forming a waveform period in which a heat load applied to the electrode is considerable in the driving current waveform DW4, that is, in the example shown in Table 9, a constituent ratio of the waveform C forming the third waveform period CC is set to become higher. In other words, in the driving current waveform DW4, a ratio of the entire length of the third waveform period CC to the entire length of the first waveform period CA and the entire length of the second waveform period CB is set to become higher as the driving power Wd is decreased.

According to this configuration, for example, a constituent ratio of the waveform C in which a heat load applied to the electrode is considerable in the driving current waveform DW4 is set to become higher as the driving power Wd supplied to the discharge lamp 90 is decreased. Therefore, time for heating the first electrode 92 can be increased, and thus it is possible to improve a melting amount of the protrusion 552p of the first electrode 92. Consequently, according to the configuration, in a case where the driving power Wd is reduced, a shape of the protrusion 552p of the first electrode 92 can be easily maintained, and the occurrence of flickering can be minimized.

In the above-described example, the method has been described in which a constituent ratio of each waveform is also changed according to a change in the driving power Wd, but the invention is not limited thereto. In this configuration, a sum of the lengths of the first polarity periods in each waveform period may become larger as the driving power Wd is decreased. As a method of making a sum of the lengths of the first polarity periods in each waveform period become larger as the driving power Wd is decreased, for example, a method of increasing a length of an AC period in each waveform period or a method of increasing a duration ratio may be selected.

Fifth Embodiment

A fifth embodiment is different from the fourth embodiment in that ranges of duration ratios of a first waveform period and a second waveform period are the same as each other.

In the following description, the same constituent elements as in the above-described embodiments are given the same reference numerals, and description thereof will be omitted in some cases.

Figure 12:
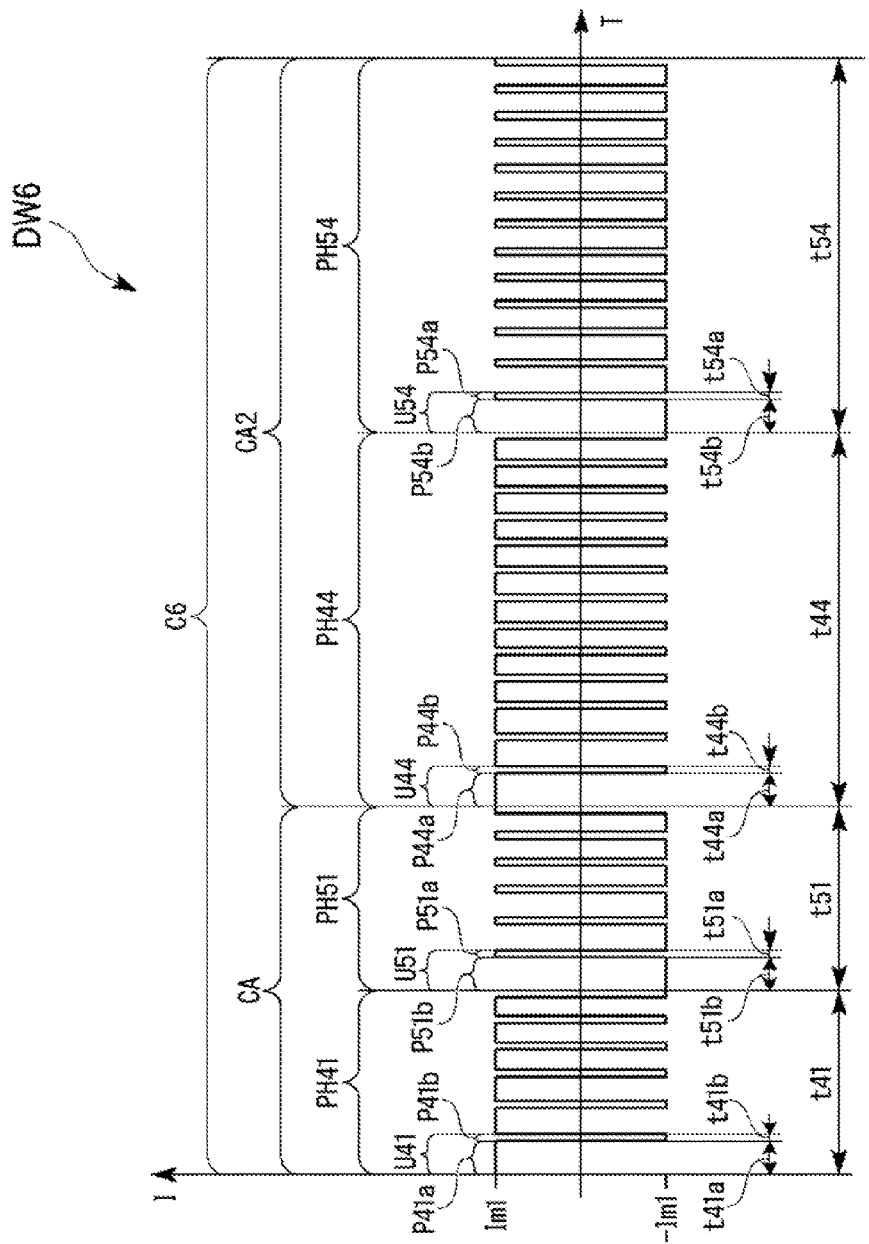
FIG. 12 is a diagram illustrating a driving current waveform according to a fifth embodiment.

FIG. 12 is a diagram illustrating a driving current waveform DW6 of the present embodiment. In FIG. 12, a longitudinal axis expresses the driving current I, and a transverse axis expresses time T.

As illustrated in FIG. 12, the driving current waveform DW6 is formed of a plurality of consecutive control cycles C6. The control cycle C6 includes a first waveform period CA and a second waveform period CA2.

The second waveform period CA2 includes a first AC period PH44 and a second AC period PH54. The first AC period PH44 and the second AC period PE54 are periods in which an AC current whose polarity is inverted between a current value Im1 and a current value −Im1 is supplied to the discharge lamp 90 as the driving current I.

The first AC period PH44 is a period in which the first electrode 92 is heated. The first AC period PH44 includes a plurality of consecutive first unit driving periods U44 each of which is formed of a first polarity period P44a in which the first electrode 92 serves as an anode and a second polarity period P44b in which the second electrode 93 serves as an anode.

The second AC period PH54 is a period in which the second electrode 93 is heated. The second AC period PH54 includes a plurality of consecutive second unit driving periods U54 each of which is formed of a first polarity period P54a in which the first electrode 92 serves as an anode and a second polarity period P54b in which the second electrode 93 serves as an anode.

The number of unit driving periods forming each AC period of the second waveform period CA2 is larger than the number of unit driving periods forming each AC period of the first waveform period CA.

In the second waveform period CA2 of the present embodiment, for example, a waveform of the first AC period PH44 is set to be the same as a waveform of the second AC period PH54 except that a polarity is inverted. In other words, a length t44a of the first polarity period P44a in each of the first unit driving periods U44 is the same as a length U54b of the second polarity period P54b in each of the second unit driving periods U54. A length t44b of the second polarity period P44b in each of the first unit driving periods U44 is the same as a length t54a of the first polarity period P54a in the second unit driving periods U54. For this reason, in the present embodiment, a length t44 of the first AC period PH44 is the same as a length t54 of the second AC period PH54.

The first AC period PH44 of the second waveform period CA2 is formed of a waveform having the same duration ratio as that of the waveform A forming the first AC period PH41 of the first waveform period CA. In other words, the first unit driving periods U44 forming the first AC period PH44 of the second waveform period CA2 are set to be the same as the first unit driving periods U41 forming the first AC period PH41 of the first waveform period CA. In other words, the second waveform period CA2 corresponds to a period in which the number of first unit driving periods U41 included in the first waveform period CA is made large. This is also the same for the second AC period PH54 The length t44a and a duration ratio of the first polarity period P44a of the first unit driving period U44 may be set as in the above Table 4 in the fourth embodiment as an example.

The length t44 of the first AC period PH44 of the second waveform period CA2 is larger than the length t41 of the first AC period PH41 of the first waveform period CA. For this reason, a sum of the lengths t44a of the first polarity periods P44a in the second waveform period CA2 is larger than a sum of the lengths t41a of the first polarity periods P41a in the first waveform period CA. Therefore, a heat load applied to the first electrode 92 and the second electrode 93 in the second waveform period CA2 can be made more considerable than in the first waveform period CA.

According to the present embodiment, the first waveform period CA, and the second waveform period CA2 in which a heat load applied to the electrode is more considerable than in the first waveform period CA, can be easily formed by using waveforms whose ranges of duration ratios are the same as each other.

In the present embodiment, a waveform of the first AC period and a waveform of a second AC period may not be the same as each other.

Sixth Embodiment

A sixth embodiment is different from the fourth embodiment in that a second waveform period is formed of a single AC period.

In the following description, the same constituent elements as in the above-described embodiments are given the same reference numerals, and description thereof will be omitted in some cases.

Figure 13:
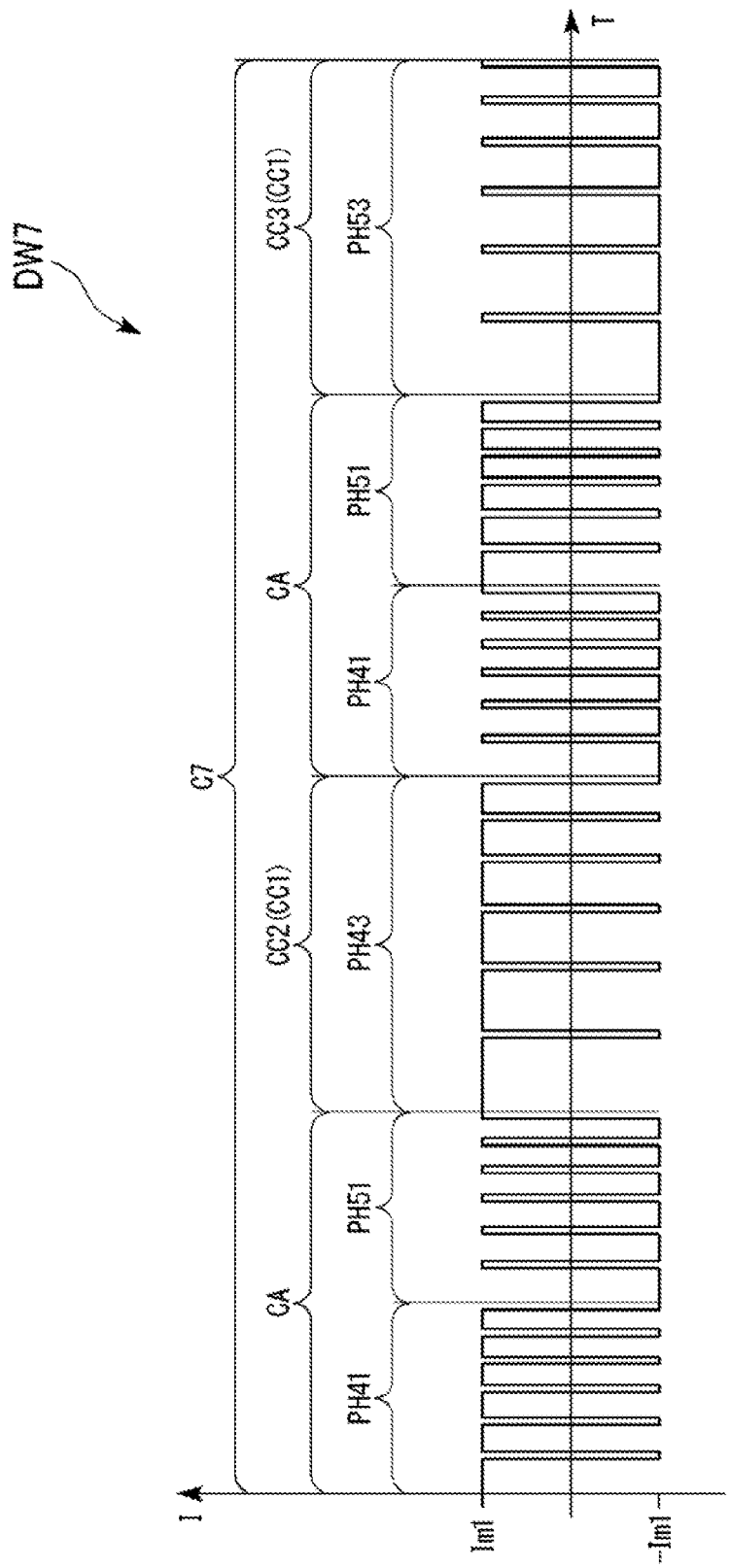
FIG. 13 is a diagram illustrating a driving current waveform according to a sixth embodiment.

FIG. 13 is a diagram illustrating a driving current waveform DW7 of the present embodiment. In FIG. 13, a longitudinal axis expresses the driving current I, and a transverse axis expresses time T.

As illustrated in FIG. 13, the driving current waveform DW7 is formed of a plurality of consecutive control cycles C7. The control cycle C7 includes a first waveform period CA and a second waveform period CC1. The second waveform period CC1 includes a first AC waveform period CC2 and a second AC waveform period CC3.

The first AC waveform period CC2 is formed of a single AC period, that is, the first AC period PH43 described in the fourth embodiment.

The second AC waveform period CC3 is formed of a single AC period, that is, the second AC period PH53 described in the fourth embodiment.

In the control cycle C7, the first waveform period CA, the first AC waveform period CC2, the first waveform period CA, and the second AC waveform period CC3 are provided in this order. In other words, the first waveform period CA is provided between the first AC waveform period CC2 and the second AC waveform period CC3. In the present embodiment, the first AC waveform period CC2 and the second AC waveform period CC3 are alternately repeated with the first waveform period CA interposed therebetween.

According to the present embodiment, a single AC period in which a heat load applied to the electrode is more considerable than in the first waveform period CA is inserted between the two first waveform periods CA, and polarities of the AC period are alternately inverted. Consequently, it is easy to adjust a variation in a heat load applied to the first electrode 92 and the second electrode 93 in accordance with characteristics of the first electrode 92 and the second electrode 93, and it is easy to adjust growth of the protrusions 552p and 562p.

In the present embodiment, the following configurations and methods may be employed.

In the above description, the single first waveform period CA is provided, and one of the first AC waveform period CC2 and the second AC waveform period CC3 is provided following the single first waveform period CA, but the invention is not limited thereto. In the present embodiment, a plurality of first waveform periods CA may be provided, and one of the first AC waveform period CC2 and the second AC waveform period CC3 may be provided following the plurality of first waveform periods CA.

In the above description, the first AC waveform period CC2 and the second AC waveform period CC3 are alternately provided with the first waveform period CA interposed therebetween, but the invention is not limited thereto. In the present embodiment, for example, a plurality of first waveform periods CA and first AC waveform periods CC2 are alternately provided, and then a plurality of first waveform periods CA and second AC waveform periods CC3 are alternately provided.

In the present embodiment, the first waveform period may include an AC waveform period formed of a single AC period, and each of the first waveform period and the second waveform period may include an AC waveform period formed of a single AC period.

As described in the present embodiment, in the present specification, in a case where the second waveform period includes the first AC period and the second AC period, at least one of second waveform periods which are temporally continuously provided includes the first AC period, and at least one of second waveform periods which are temporally continuously provided includes the second AC period. A single second waveform period including the first AC period and a single second waveform period including the second AC period may be the same as or different from each other. For example, in the example illustrated in FIG. 13, the single second waveform period including the first AC period is the first AC waveform period CC2, and the single second waveform period including the second AC period is the second AC waveform period CC3. This is also the same for the first waveform period.

The configurations of the first to sixth embodiments may be combined with each other as appropriate so as not to cause contradiction therebetween, and the order and the repetition number of the waveforms of each embodiment in the combinations is not particularly limited.

In the respective embodiments, a description has been made of an example of a case where the invention is applied to the transmissive projector, but the invention is applicable to a reflective projector. Here, the term "transmissive" indicates a type in which a liquid crystal light valve including a liquid crystal panel or the like transmits light therethrough. The term "reflective" indicates a type in which the liquid crystal light valve reflects light. A light modulation device is not limited to a liquid crystal panel or the like, and may be a light modulation device using, for example, a micro-mirror.

In the respective embodiments, a description has been made of an example of the projector 500 using the three liquid crystal panels 560R, 560G and 560B (the liquid crystal light valves 330R, 330G and 330B), but the invention is applicable to a projector using only a single liquid crystal panel, and to a projector using four or more liquid crystal panels.

Example

As an Example, a discharge lamp with a rating of 200 W was driven according to the driving current waveform DW1 of the first embodiment. In the Example, as parameters in each period, the values shown in the above Table 1 were used. In Table 1, a length of each of the first AC period PH11 and the second AC period PH21 is 12.54 milliseconds (ms), that is, corresponds to a length of a half cycle of an AC current of about 40 Hz, and a ratio of polarity periods in which an electrode on a heated side in each AC period serves as an anode is about 81%. In other words, a sum of polarity periods in which an electrode on a heated side in each AC period serves as an anode is 10.14 milliseconds (ms) in the first AC period PH11 and the second AC period PH21.

As a comparative example, in the first AC period PH11 and the second AC period PH21, the discharge lamp with a rating of 200 W was driven by using an AC current whose polarity is inverted every 10.14 milliseconds (ms) which is a sum of polarity periods in which an electrode on a heated side in each AC period serves as an anode. The AC current whose polarity is inverted every 10.14 milliseconds (ms) is, for example, a square wave AC current with a frequency of about 49 Hz.

In both of the Example and the comparative example, a discharge state and a shape of the protrusion of the electrode were observed when the discharge lamp was driven with a driving power of 140 W for an hour.

As a result, in the comparative example, it was observed that the protrusion was deformed and was flattened, and thus flickering occurred.

On the other hand, in the Example, it was observed that the protrusion was maintained to be thick, and stable discharge was continuously maintained.

Through the above Example, the usefulness of the invention could be confirmed.

What is claimed is:

1. A discharge lamp driving device comprising:
 a discharge lamp driving unit configured to supply a driving current to a discharge lamp provided with a first electrode and a second electrode; and
 a controller configured to control the discharge lamp driving unit,
 wherein the driving current includes a first AC period and a second AC period in which an AC current is supplied to the discharge lamp,
 wherein the first AC period includes a plurality of consecutive first unit driving periods each of which is formed of a first polarity period in which the first electrode serves as an anode and a second polarity period in which the second electrode serves as an anode, a length of the first polarity period being larger than a length of the second polarity period,
 wherein the second AC period includes a plurality of consecutive second unit driving periods each of which is formed of the first polarity period and the second polarity period, the length of the second polarity period being larger than the length of the first polarity period, wherein lengths of the first unit driving periods which are temporally adjacent to each other are different from each other, and wherein lengths of the second unit driving periods which are temporally adjacent to each other are different from each other.

2. The discharge lamp driving device according to claim 1, wherein a ratio of the length of the first polarity period to the length of the second polarity period in each of the first unit driving periods is equal to or more than 3.0, and wherein a ratio of the length of the second polarity period to the length of the first polarity period in each of the second unit driving periods is equal to or more than 3.0.

3. The discharge lamp driving device according to claim 1, wherein each of the length of the second polarity period in the first unit driving period and the length of the first polarity period in the second unit driving period is less than 1.0 ms.

4. The discharge lamp driving device according to claim 3, wherein each of the length of the second polarity period in the first unit driving period and the length of the first polarity period in the second unit driving period is equal to or more than 0.16 ms.

5. The discharge lamp driving device according to claim 1, wherein each of the length of the first polarity period in the first unit driving period and the length of the second polarity period in the second unit driving period is equal to or more than 1.0 ms.

6. The discharge lamp driving device according to claim 1, wherein each of a length of the first AC period and a length of the second AC period is equal to or more than 5.0 ms.

7. The discharge lamp driving device according to claim 1, wherein a length of the first AC period and a length of the second AC period are the same as each other.

8. The discharge lamp driving device according to claim 1, wherein a length of the first AC period and a length of the second AC period are different from each other.

9. The discharge lamp driving device according to claim 1, wherein the driving current further includes a third AC period in which an AC current is supplied to the discharge lamp, wherein the third AC period includes a plurality of consecutive third unit driving periods in which the length of the first polarity period and the length of the second polarity period are the same as each other, and is provided immediately after at least one of the first AC period and the second AC period.

10. The discharge lamp driving device according to claim 1, wherein each of the length of the first AC period and the length of the second AC period is set to become larger as driving power supplied to the discharge lamp is decreased.

11. The discharge lamp driving device according to claim 1, wherein each of an average length of the first polarity periods in the first AC period and an average length of the second polarity periods in the second AC period is set to become smaller as driving power supplied to the discharge lamp is decreased.

12. The discharge lamp driving device according to claim 1, further comprising:

a voltage detection unit configured to detect an inter-electrode voltage between the first electrode and the second electrode, wherein each of a length of the first AC period and a length of the second AC period is set to become larger as the inter-electrode voltage becomes higher.

13. The discharge lamp driving device according to claim 1, further comprising:

a voltage detection unit configured to detect an inter-electrode voltage between the first electrode and the second electrode, wherein each of an average length of the first polarity periods in the first AC period and an average length of the second polarity periods in the second AC period is set to become smaller as the inter-electrode voltage becomes higher.

14. The discharge lamp driving device according to claim 1, wherein lengths of the first polarity periods which are temporally adjacent to each other with the second polarity period interposed therebetween are different from each other in the first AC period, and wherein lengths of the second polarity periods which are temporally adjacent to each other with the first polarity period interposed therebetween are different from each other in the second AC period.

15. The discharge lamp driving device according to claim 1, wherein lengths of the plurality of first polarity periods are set to decrease as the first polarity period is provided temporally later in the first AC period, and wherein lengths of the plurality of second polarity periods are set to decrease as the second polarity period is provided temporally later in the second AC period.

16. The discharge lamp driving device according to claim 1, wherein the driving current further includes a first waveform period and a second waveform period each of which is formed of the first AC period and the second AC period, wherein a sum of lengths of the first polarity periods in the first AC period of the second waveform period is larger than a sum of lengths of the first polarity periods in the first AC period of the first waveform period, and wherein a sum of lengths of the second polarity periods in the second AC period of the second waveform period is larger than a sum of lengths of the second polarity periods in the second AC period of the first waveform period.

17. The discharge lamp driving device according to claim 16, wherein the second waveform period includes a first AC waveform period formed of only the first AC period, and a second AC waveform period formed of only the second AC period, and wherein the first waveform period is provided between the first AC waveform period and the second AC waveform period.

18. The discharge lamp driving device according to claim 16, wherein, in the second waveform period, a ratio of the length of the first polarity period to the length of the second polarity period in each of the first unit driving periods of the first AC period is equal to or more than 6.0, and a ratio of the length of the second polarity period to the length of the first polarity period in each of the second unit driving periods of the second AC period is equal to or more than 6.0.

19. The discharge lamp driving device according to claim 16, wherein,
in the second waveform period, the maximum value of a ratio of the length of the first polarity period to the length of the second polarity period in each of the first unit driving periods of the first AC period and the maximum value of a ratio of the length of the second polarity period to the length of the first polarity period in each of the second unit driving periods of the second AC period are greater than in the first waveform period.

20. The discharge lamp driving device according to claim 16, wherein,
in the second waveform period, the minimum value of a ratio of the length of the first polarity period to the length of the second polarity period in each of the first unit driving periods of the first AC period and the minimum value of a ratio of the length of the second polarity period to the length of the first polarity period in each of the second unit driving periods of the second AC period are greater than in the first waveform period.

21. The discharge lamp driving device according to claim 16, wherein
each of the length of the first AC period of the second waveform period and the length of the second AC period of the second waveform period is larger than the lengths of the first AC period and the second AC period of the first waveform period.

22. A projector comprising:
a discharge lamp configured to emit light;
the discharge lamp driving device according to claim 1;
a light modulation element configured to modulate light emitted from the discharge lamp according to a video signal; and
a projection optical system configured to project light modulated by the light modulation element.

23. A discharge lamp driving method for driving a discharge lamp to supply a driving current to the discharge lamp provided with a first electrode and a second electrode, the method comprising:
supplying the driving current including a first AC period and a second AC period in which an AC current is supplied to the discharge lamp,
wherein the first AC period includes a plurality of consecutive first unit driving periods each of which is formed of a first polarity period in which the first electrode serves as an anode and a second polarity period in which the second electrode serves as an anode, a length of the first polarity period being larger than a length of the second polarity period,
wherein the second AC period includes a plurality of consecutive second unit driving periods each of which is formed of the first polarity period and the second polarity period, the length of the second polarity period being larger than the length of the first polarity period,
wherein lengths of the first unit driving periods which are temporally adjacent to each other are different from each other, and
wherein lengths of the second unit driving periods which are temporally adjacent to each other are different from each other.

24. The discharge lamp driving device according to claim 1, wherein
ratios of the length of the first polarity period to the length of the second polarity period in the first unit driving periods which are temporally adjacent to each other are different from each other, and
wherein ratios of the length of the second polarity period to the length of the first polarity period in the second unit driving periods which are temporally adjacent to each other are different from each other.

25. A discharge lamp driving device comprising:
a discharge lamp driving unit configured to supply a driving current to a discharge lamp provided with a first electrode and a second electrode; and
a controller configured to control the discharge lamp driving unit,
wherein the driving current includes a first AC period and a second AC period in which an AC current is supplied to the discharge lamp,
wherein the first AC period includes a plurality of consecutive first unit driving periods each of which is formed of a first polarity period in which the first electrode serves as an anode and a second polarity period in which the second electrode serves as an anode, a length of the first polarity period being larger than a length of the second polarity period,
wherein the second AC period includes a plurality of consecutive second unit driving periods each of which is formed of the first polarity period and the second polarity period, the length of the second polarity period being larger than the length of the first polarity period,
wherein lengths of the first polarity periods which are temporally adjacent to each other with the second polarity period interposed therebetween are different from each other in the first AC period, and
wherein lengths of the second polarity periods which are temporally adjacent to each other with the first polarity period interposed therebetween are different from each other in the second AC period.

26. A discharge lamp driving device comprising:
a discharge lamp driving unit configured to supply a driving current to a discharge lamp provided with a first electrode and a second electrode; and
a controller configured to control the discharge lamp driving unit,
wherein the driving current includes a first AC period and a second AC period in which an AC current is supplied to the discharge lamp,
wherein the first AC period includes a plurality of consecutive first unit driving periods each of which is formed of a first polarity period in which the first electrode serves as an anode and a second polarity period in which the second electrode serves as an anode, a length of the first polarity period being larger than a length of the second polarity period,
wherein the second AC period includes a plurality of consecutive second unit driving periods each of which is formed of the first polarity period and the second polarity period, the length of the second polarity period being larger than the length of the first polarity period,
wherein a ratio of the length of the first polarity period to the length of the second polarity period in each of the first unit driving periods is equal to or more than 3.0, and
wherein a ratio of the length of the second polarity period to the length of the first polarity period in each of the second unit driving periods is equal to or more than 3.0.

27. A discharge lamp driving device comprising:
- a discharge lamp driving unit configured to supply a driving current to a discharge lamp provided with a first electrode and a second electrode; and
- a controller configured to control the discharge lamp driving unit,
- wherein the driving current includes a first AC period and a second AC period in which an AC current is supplied to the discharge lamp,
- wherein the first AC period includes a plurality of consecutive first unit driving periods each of which is formed of a first polarity period in which the first electrode serves as an anode and a second polarity period in which the second electrode serves as an anode, a length of the first polarity period being larger than a length of the second polarity period,
- wherein the second AC period includes a plurality of consecutive second unit driving periods each of which is formed of the first polarity period and the second polarity period, the length of the second polarity period being larger than the length of the first polarity period, and
- wherein each of the length of the second polarity period in the first unit driving period and the length of the first polarity period in the second unit driving period is equal to or more than 0.16 ms and less than 1.0 ms.

* * * * *